United States Patent [19]
Wakayama

[11] Patent Number: 6,130,905
[45] Date of Patent: Oct. 10, 2000

[54] WIRELESS COMMUNICATION SYSTEM

[75] Inventor: Hironobu Wakayama, Nagoya, Japan

[73] Assignee: Brother Kogyo Kabushiki Kaisha, Nagoya, Japan

[21] Appl. No.: 08/887,332

[22] Filed: Jul. 2, 1997

[30] Foreign Application Priority Data

| Jul. 3, 1996 | [JP] | Japan | ................................ 8-173758 |
| Jul. 9, 1996 | [JP] | Japan | ................................ 8-179004 |

[51] Int. Cl.⁷ .................................................. H04B 1/713
[52] U.S. Cl. ........................................... 375/132; 370/468
[58] Field of Search .............................. 375/202; 455/71; 370/330, 436, 437, 445, 468

[56] References Cited

U.S. PATENT DOCUMENTS

| 5,513,210 | 4/1996 | Vook et al. | ................................ 370/436 |
| 5,533,025 | 7/1996 | Fleek et al. | ................................ 370/437 |
| 5,541,954 | 7/1996 | Emi | ................................ 375/202 |
| 5,644,576 | 7/1997 | Bauchot et al. | ................................ 375/202 |
| 5,850,390 | 12/1998 | Ramel | ................................ 370/436 |

*Primary Examiner*—Temesghen Ghebretinsae
*Assistant Examiner*—Kevin M Burd
*Attorney, Agent, or Firm*—Oliff & Berridge, PLC

[57] ABSTRACT

A wireless communication device for performing bi-directional communication using a frequency hopping method, in which the communication time at any one frequency can be varied. The user uses the dial to adjust the length of time during which a single frequency is used. Accordingly, if the volume of data is large, as in image data, the communication time can be increased. If the volume of data is small, as in voice data, the communication time can be decreased. If privacy is desirable, the communication time is decreased, whereas increasing the communication time will increase the transfer rate. Such settings can be made manually by the user to suit the user's needs, or can be made automatically based on the type of data being transferred.

18 Claims, 19 Drawing Sheets

(COMMUNICATION DEVICE 1a)

(COMMUNICATION DEVICE 1b)

HOLDING TIME DATA　　TRANSMISSION DATA
(HEACER)

<DATA FORMAT>

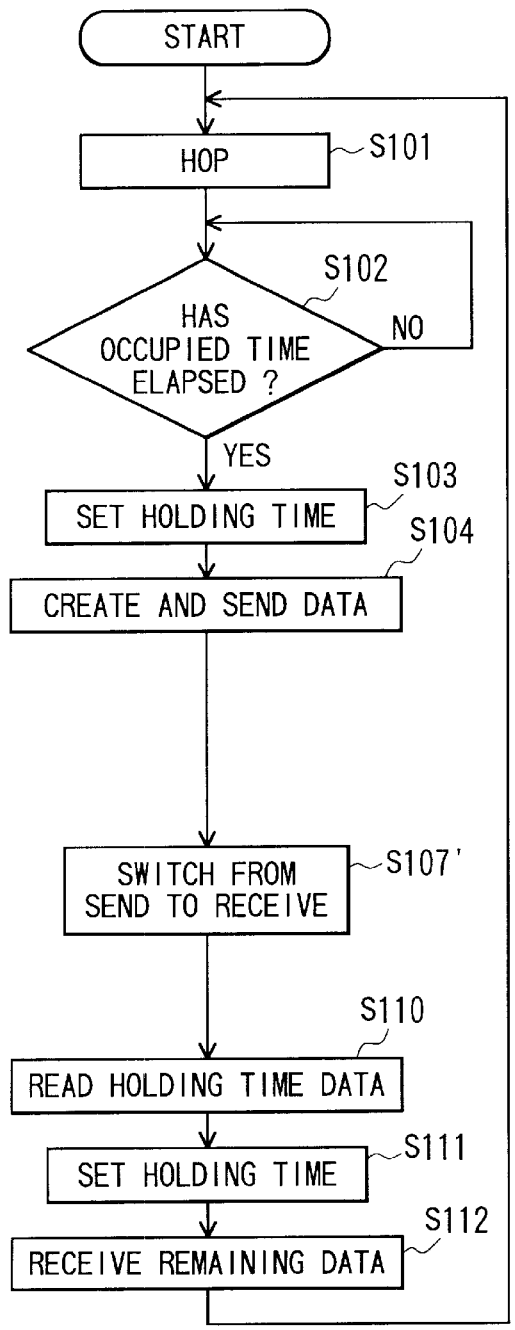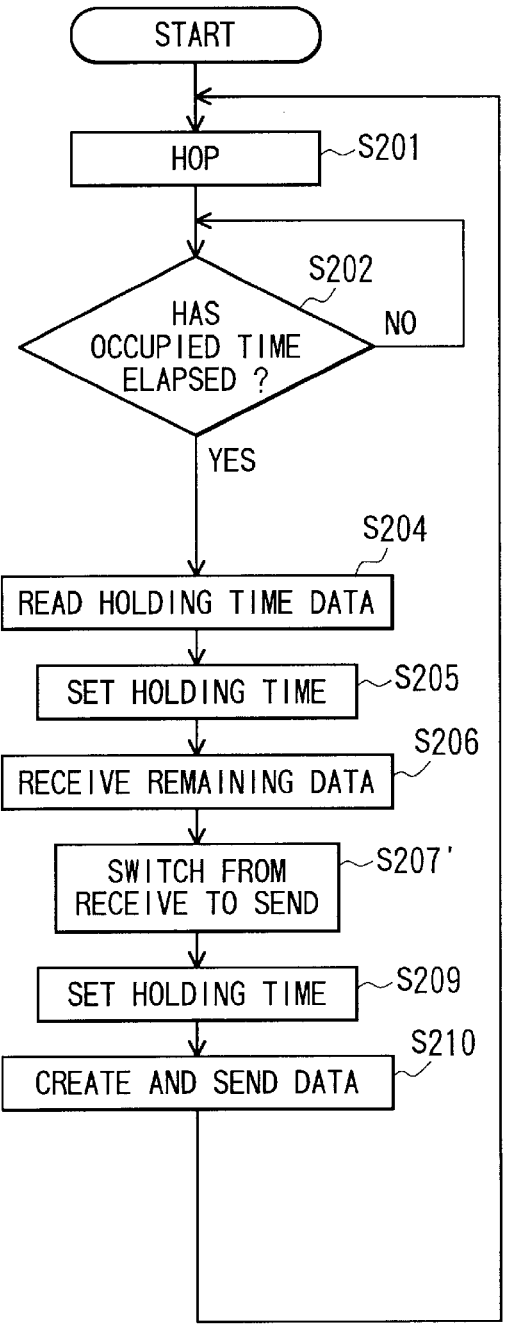

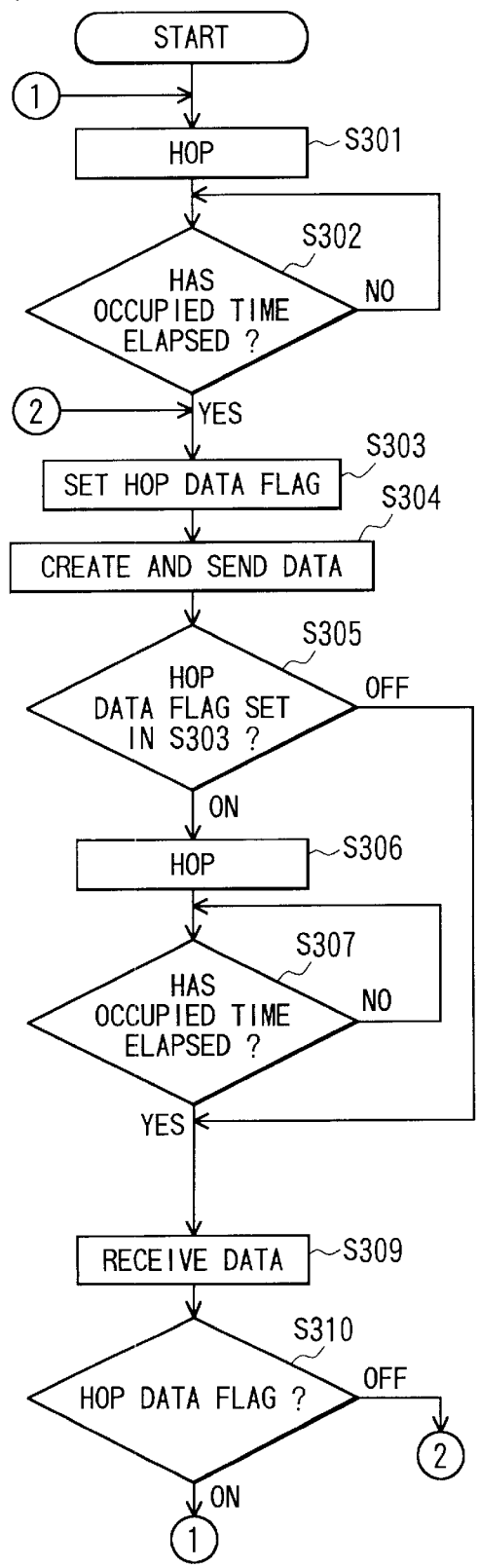
FIG. 9 (a) (COMMUNICATION DEVICE 1a)
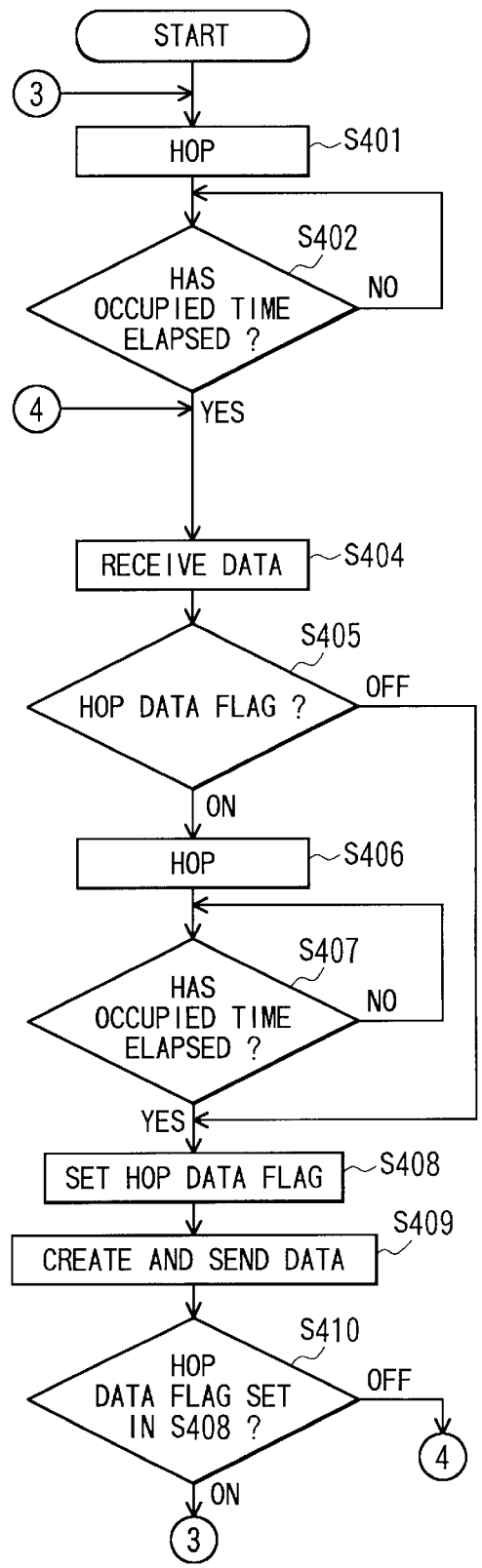
FIG. 9 (b) (COMMUNICATION DEVICE 1b)

<DATA FORMAT>

<DATA FORMAT>

WIRELESS COMMUNICATION SYSTEM

BACKGROUND OF THE INVENTION

1. Field of the Invention

The present invention relates to a wireless communication system for performing bidirectional communication between communication devices using a spread spectrum communications technique and particularly using a frequency hopping method.

2. Description of the Related Art

There has been proposed a wireless communication system using a spread spectrum communication method. This type of wireless communication system employs a frequency hopping method to increase effectiveness and privacy. Frequency hopping is performed according to a predetermined rule defined by a spread code series.

That is, a frequency switching sequence (hereinafter referred to as "hopping pattern") used during communication is predetermined. All the communication devices in the communication system always follow the same hopping pattern Thus, transmission and reception of signals can be performed by making the spread code series (frequency hopping pattern) common for a group of the communication devices.

SUMMARY OF THE INVENTION

FIG. 1 shows a structure of a conceivable communication device for performing bi-directional communication with a remote communication device according to a frequency hopping spread spectrum communication method.

First, the transmission operations of the communication device will be described below.

A synchronization circuit 4 includes a timer for generating synchronization signals. The spread code series generator 5 sequentially outputs the predetermined spread code series in synchronization with the synchronization signals.

The spread code series outputted from the spread code series generator 5 is supplied to a frequency synthesizer 6. The frequency synthesizer 6 generates frequency-hopping signals whose frequency hops from one to another based on the supplied spread code series. The frequency-hopping signals serve as carrier waves for transmitting data to and for receiving data from the remote communication device.

Thus, the frequency-hopping signals are outputted from the frequency synthesizer 6, While hopping according to the spread code series in synchronization with the synchronization signals. Transmission data to be transmitted to the remote communication device is modulated into a primary modulation signal, before being inputted via a transmission data input terminal 20 to the communication device. The primary modulation signal is then multiplied by an up converter 3 with the frequency-hopping signals outputted from the frequency synthesizer 6. Thus, the output frequency of the transmission signals are converted from the primary modulation frequency. Thus, the transmission signals are created with their frequency being spread or hopped. After the frequency of the transmission signals is thus converted by the up converter 3, the transmission signals are amplified by an amplifier 8. Then, the transmission signals pass through a switching device 10 before being transmitted from an antenna 11 toward the remote communication device.

Next, the reception operations of the communication device will be described below.

When signals, transmitted from the remote communication device, are received at the antenna 11, the reception signals are separated from the transmission signals by the switching device 10. The reception signals are amplified by an amplifier 9, and inputted into a down converter 7. The down converter 7 converts the frequency of the reception signals based on the frequency-hopping signals supplied from the frequency synthesizer 6. That is, the down converter 7 multiplies the reception signals with the frequency-hopping signals. Thus, the frequency of the reception signal is converted into the primary modulation frequency. The reception signals are then demodulated and converted to reception data by a demodulator 12. This reception data is then outputted both to a reception data output terminal 21 and to the synchronization circuit 4.

In the reception time slot, the synchronization circuit 4 generates synchronization signals based on the reception data demodulated by the demodulator 12. That is, the synchronization circuit 4 generates synchronization signals when the reception data includes a specific bit array. More specifically, the synchronization circuit 4 counts a predetermined length of time with using the timer after receiving the specific bit pattern, and then generates synchronization signals. Thus, the synchronization circuit 4 can output synchronization signals which are in synchronization with synchronization signals generated in the remote communication device. The spread code series generator 5 sequentially outputs the predetermined spread codes in synchronization with the synchronization signals.

In the same manner as in the transmission time slot, the spread code series, outputted from the spread code series generator 5, is supplied to the frequency synthesizer 6. The frequency synthesizer 6 generates frequency-hopping signals whose frequency hops from one to another based on the inputted spread code series. The down converter 7 multiplies the reception signals with the frequency-hopping signals, to thereby de-spread the reception signals and accordingly create the output signals. The de-spread signals are then demodulated by the demodulator 12 into reception data. The reception data is outputted from the reception data output terminal 21 and supplied into a data computing circuit (not shown).

In this way, the communication device operates as both a transmitter and a receiver while the switching device 10 performs switching operation, to thereby achieve bidirectional communication.

As described above, the frequency of the frequency-hopping signals hops according to the spread code series, which are outputted from the spread code series generator 5 in synchronization with the synchronization signals outputted from the synchronization circuit 4. Thus, the frequency of the frequency-hopping signals hops at a fixed time interval (which will be referred to as a holding time T' hereinafter).

It is noted, however, that it takes a certain period of time for the frequency-hopping signal to stabilize after the frequency of the signal hops. This time period will be hereinafter referred to as occupied time t. Further, with the hopping method, the amount of holding time T' allocated for actual communication at each frequency is set lower than a maximum limit, which is predetermined for the frequency-hopping communication method in order to maintain privacy and to allow the use of multiple channels. The holding time T' is therefore set sufficiently smaller than the maximum limit.

It is now assumed that the frequency of the frequency-hopping signals hops as shown in FIG. 2. For example, the frequency f hops from a frequency band f1 to a different frequency band f2. Directly after the frequency hops from one frequency band to a next frequency band the frequency is unstable during the occupied time t. Communication is not possible during the occupied time t. The entire system must wait until the frequency has stabilized. As a result, the transmission speed becomes lower in principle than that of a fixed carrier wave frequency communication used in normal amateur radios and the like. However, In terms of privacy, it is desirable to frequently hop the frequency to different frequencies rather than communicating entirely at a fixed carrier wave frequency.

In view of the foregoing, It is an object of the present invention to provide a wireless communication system capable of either increasing transfer rate or improving privacy.

In order to attain the above and other objects, the present invention provides a wireless communication device for performing bi-directional communication with a remote communication device using a frequency hopping method, the device comprising: means for changing a frequency, at which communication is performed: means for performing communication with the changed frequency during a holding time; and means for controlling a length of the holding time and for controlling the communication means to perform communications according to the controlled holding time.

According to another aspect, the present invention provides a wireless communication device for performing bi-directional communication with a remote communication device using a frequency hopping method, the device comprising: means for performing communication with a remote communication device at a frequency; means for detecting an error rate of signals received from the remote communication device at the frequency; memory means for storing a predetermined error rate reference value; means for determining whether or not the detected error rate of the communicated signals is higher than the predetermined error rate reference-value; and means for changing the frequency into another frequency when the error rate determining means deter-mines that the detected error rate is higher than the predetermined error rate reference value, the frequency changing means controlling the communication means to perform communications according to the changed frequency.

BRIEF DESCRIPTION OF THE DRAWINGS

In the drawings:

FIGS. 7(a) and 7(b) are flowcharts showing the processes of two communication devices of a modification of the first embodiment that are engaged in communication with each another;

FIGS. 9(a) and 9(b) are flowcharts showing the processes of two communication devices of a second embodiment that are engaged in communication with each another;

DETAILED DESCRIPTION OF THE PREFERRED EMBODIMENTS

A wireless communication system according to preferred embodiments of the present invention will be described while referring to the accompanying drawings.

A first embodiment will be described below with reference to FIGS. 3 through 6.

Figure 3:
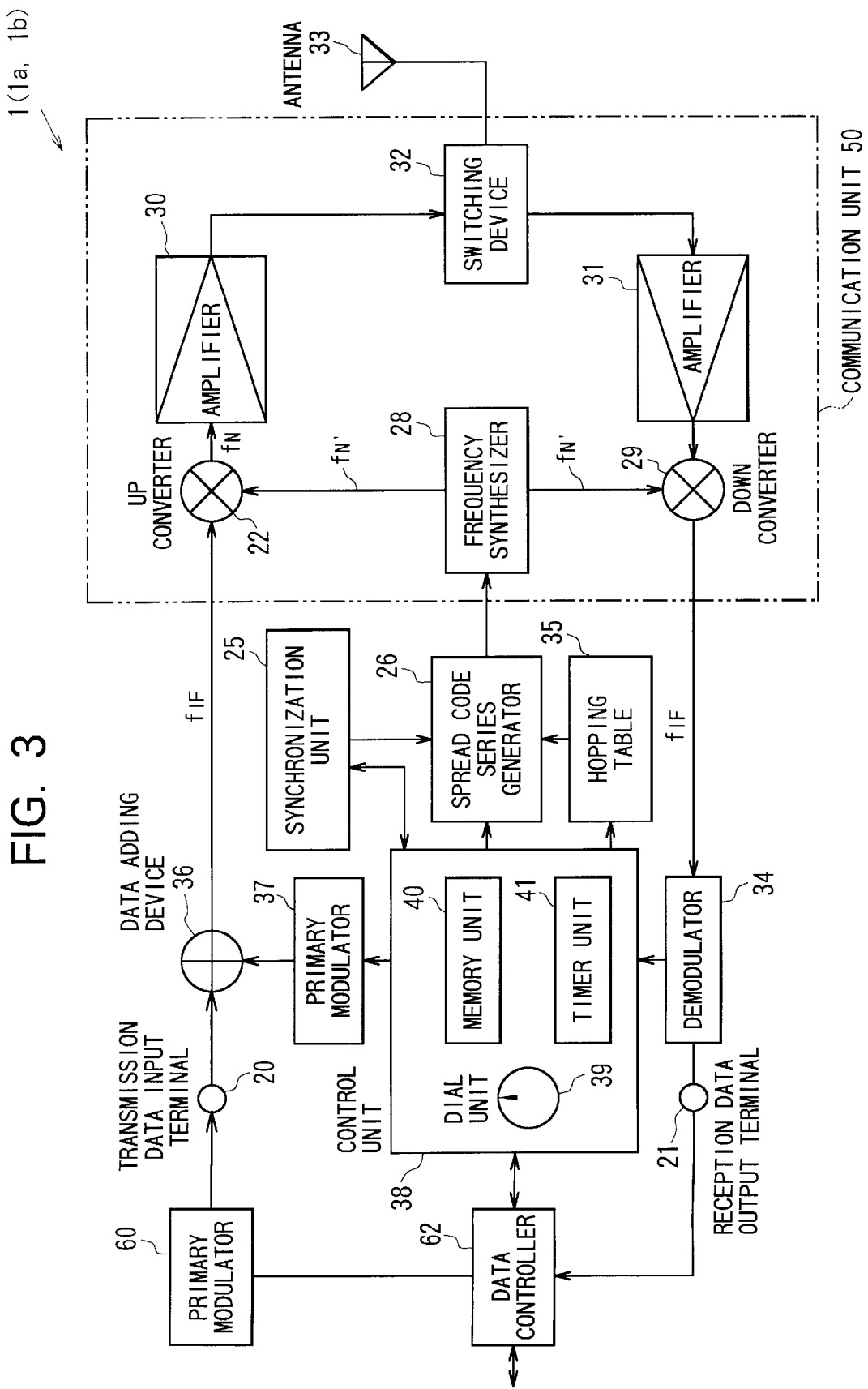
FIG. 3 is a block diagram of a communication device for achieving wireless communication according to a first embodiment of the present invention.
Figure 4:
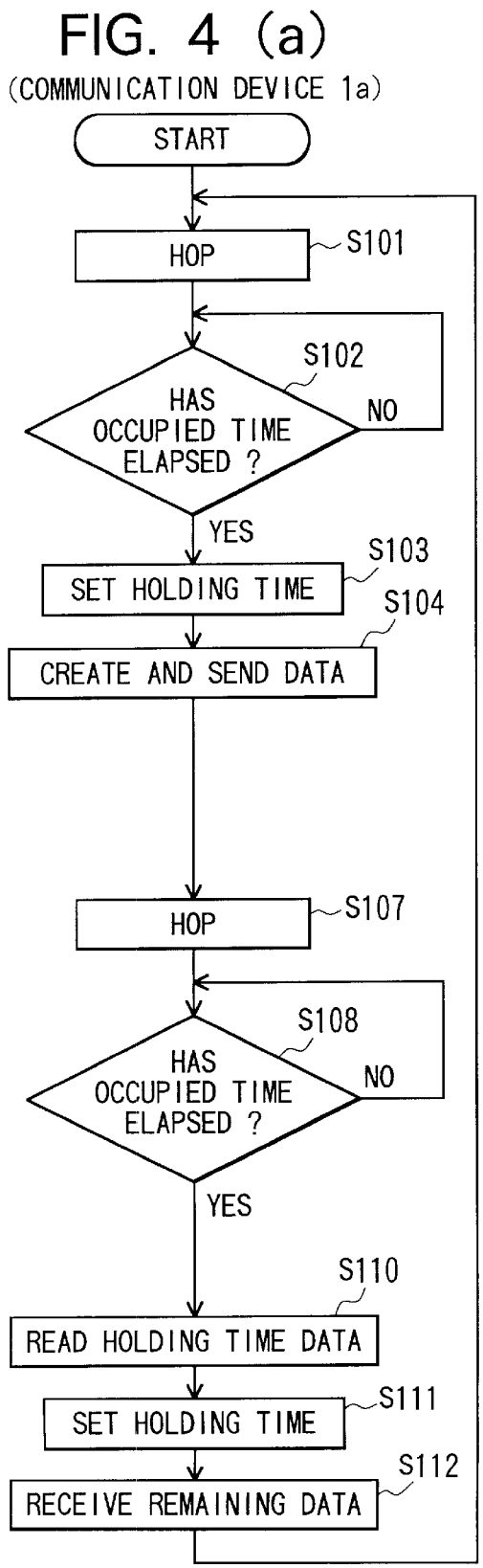
FIGS. 4(a) and 4(b) are flowcharts showing the processes of two communication devices 1a and 1b of the first embodiment that are engaged in communication with each another.
Figure 4:
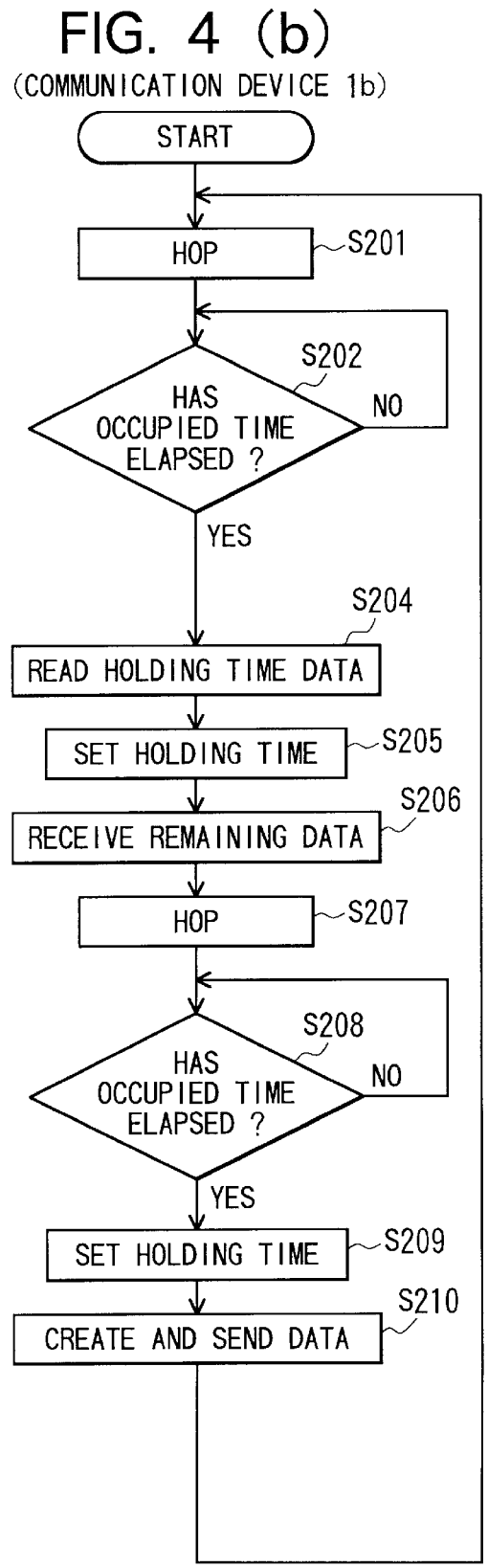

As shown in FIG. 3, a communication device 1 of the present embodiment is provided with; a transmission data input terminal 20, a reception data output terminal 21, a synchronization unit 25, a spread code series generator 26, an antenna 33, a demodulator 34, a hopping table 35, a data adding device 36, a primary modulator 37, a control unit 38, a communication unit 50, a transmission data primary modulator 60, and a data controller 62.

The control unit 38 is for controlling the entire device 1, and for controlling the holding time T according to the present embodiment. The control unit 38 is constructed from a CPU (not shown) for performing an entire control. The control unit 38 is provided with: a dial unit 39, a memory cry unit 40, and a timer unit 41. The dial unit 39 includes a dial knob for setting the holding time T. A user can rotate the dial knob to thereby set the holding time T to his/her desired length. The memory unit 40 is constructed from a RAM and a ROM, for example. The memory unit 40 previously stores therein data of the occupied time t which is predetermined as the length of time period during which the frequency of a frequency-hopping signal is unstable after the frequency is hopped. The holding time T, set by the user's manipulation of the dial unit 39, is also stored in the memory unit 40. The timer unit 41 is for counting the occupied time t after the frequency of the frequency-hopping signal is hopped. The timer unit 41 is also for counting a time length (T−t) obtained by subtracting the occupied time t from the holding time T after the occupied time t has elapsed after the frequency hopping is attained.

The control unit 38 is also for outputting data of the user's set holding time T to the primary modulator 37. The primary modulator 37 is for modulating the holding time data into a holding time data signal of the primary frequency $f_{IF}$.

The control unit 38 operates in response to synchronization signals supplied from the synchronization unit 25 which will be described later. The control unit 38 produces a predetermined bit pattern corresponding to the synchronization signal, and outputs the bit pattern also to the primary modulator 37.

The data controller 62 is connected to a data input/output unit (not shown) such as a telephone circuit, an ISDN circuit, a telephone receiver, a facsimile data reading unit, and the like. For example, when the communication device 1 is mounted to a telephone, the data controller 62 is connected to a telephone circuit or an ISDN circuit and a telephone receiver. When the communication device 1 is mounted to a facsimile machine, the data controller 62 is connected to a telephone circuit or an ISDN circuit and a facsimile data reading unit. When the communication device 1 is mounted to a device which can serve as both a facsimile machine and a telephone, the data controller 62 is connected to a telephone circuit or an ISDN circuit, a telephone receiver, and a facsimile data reading unit.

The data controller 62 is for receiving, from the data input/output unit (such as the telephone circuit), transmission data, such as telephone data or facsimile data, to be transmitted to a remote communication device. The data controller 62 is also for receiving data of the occupied time t and data of the user's set holding time T from the control unit 38. The data controller 62 creates transmission data for the time length (T−t) based on the received data. The data controller 62 is also for receiving reception data, which has been transmitted from the remote communication device and inputted from the reception data output terminal 21. The data controller 62 transfers the reception data to the data input/output unit such as the telephone circuit.

The data primary modulator 60 is for modulating the transmission data, outputted from the data controller 62, into a transmission data signal of the primary frequency $f_{IF}$.

Figure 6:
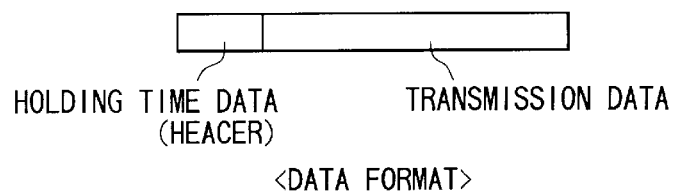
FIG. 6 is an explanatory diagram of the transmission data format used in the first embodiment.

The data adding device 36 is for adding the holding time data signal, as a header, to the transmission data signal, thereby creating a transmission signal in a data format shown in FIG. 6. The data adding device 36 outputs the transmission signal to the communication unit 50. It is noted that although not shown in the FIG. 6, the data adding device 36 also adds, to the transmission signal, the predetermined bit pattern, indicative of the synchronization signal, which is supplied from the control unit 38 via the primary modulator 37.

The communication unit 50 includes: a frequency synthesizer 28, an up converter 22, a down converter 29, amplifiers 30 and 31, and a switching device 32. The frequency synthesizer 28 is for receiving spread codes sequentially supplied from the spread code series generator 26 and for generating frequency-hopping signals whose oscillating frequencies far hop according to the supplied spread codes. The frequency-hopping signals are supplied to both the up converter 22 and the down converter 29. The up converter 22 is for receiving both the frequency-hopping signals with frequencies $f_{N'}$ and the transmission signals with the frequency $f_{IF}$. The up converter 22 mixes or multiplies the frequency-hopping signals with the transmission signals $f_{IF}$. The resultant transmission signals with their frequency $f_N$ (=$f_{N'+fIF}$) are supplied to the amplifier 30. The transmission signals are then amplified by the amplifier 30. The switching device 32 is for selectively guiding the transmission signals to the antenna 33 and guiding reception signals picked up at the antenna 33 to the amplifier 31. When the transmission signals are guided to the antenna 33 via the switching device 32, the transmission signals of the frequency $f_N$ are transmitted from the antenna 33 to the remote communication device.

Signals of the frequency $f_N$ are also transmitted from the remote communication device and picked up by the antenna 33. The switching device 32 guides the reception signals to the amplifier 31. The amplifier 31 is for amplifying the reception signals. The down converter 29 is for receiving both the reception signals of the frequency $f_N$ and the frequency-hopping signals of the frequency $f_{N'}$. The down converter 29 mixes or multiplies the reception signals and the frequency-hopping signals, thereby creating reception data signals with frequency $f_{IF}$. The reception data signals are supplied to the demodulator 34. The demodulator 34 is for demodulating the reception data signals into reception data, and for supplying the reception data into both the control unit 38 and the reception data output terminal 21.

The synchronization unit 25 includes a timer (not shown), and is for outputting synchronization signals at a fixed frequency to the control unit 38 and to the spread code series generator 26. The synchronization unit 25 is designed to attain synchronization with the remote communication device. That is, during a transmitting time slot, the synchronization unit 25 outputs synchronization signals at the fixed frequency. The synchronization signals are transmitted to the remote communication device in the form of the predetermined bit patterns. During a receiving time slot, on the other hand, the synchronization unit 25 serves to receive the reception data from the demodulator 34 via the control unit 38 and to detect whether or not the reception data includes the predetermined bit pattern indicative of a synchronization signal. When receiving the predetermined bit pattern, the synchronization unit 25 counts the predetermined length of time with using the timer, and then generates synchronization signals.

The hopping table 35 stores therein a series of spread codes as shown in the Table 1 below.

TABLE 1

| Spread code series | Series no. | 1 | 2 | 3 | 4 | ... |
|---|---|---|---|---|---|---|
| | Spread code | S1 | S2 | S3 | S4 | ... |

Thus, the table 35 contains data of a randomly-arranged plurality of spread codes. The spread code series S1, S2, . . . correspond to predetermined hopping frequencies $f_{N'}$ ($f_{N'1}$, $f_{N'2}$, . . . ) of the frequency-hopping signals to be outputted from the frequency synthesizer 28.

The spread code series generator 26 is for receiving the synchronization signals from the synchronization unit 25 and for receiving instruction signals outputted from the control unit 38. When the instruction signals are to hop the frequency of the frequency-hopping signals to the next frequency, the spread code series generator 26 selects, from the hopping table 35, a spread code that appears next to a spread code corresponding to the current frequency of the frequency-hopping signals, and outputs the selected spread code to the frequency synthesizer 28. The frequency synthesizer 28 outputs frequency-hopping signals whose frequency f corresponds to the received spread code S.

Next, bi-directional communication attained between two communication devices 1a and 1b will be described with reference to flowcharts of FIGS. 4(a) and 4(b) and the timing chart of FIG. 5.

It is noted that each of the communication devices 1a and 1b has the same structure as shown in FIG. 3. It is assumed that the communication device 1a has all the components shown in FIG. 3 which will be referred to as the reference numbers appearing in the figure followed with the symbol "a". Similarly, it is also assumed that the communication device 1b has all the components shown in FIG. 3 which will be referred to as the reference numbers appearing in the figure followed with the symbol "b". It is noted that the hopping tables 35a and 35b in the communication devices 1a and 1b store therein the same spread code series as shown in Table 1.

It is further noted that steps in FIGS. 4(a) and 4(b), whose final two digits match with each other, are performed at about the same time. It is noted that in each communication step performed between the devices 1a and 1b, synchronization is attained between the devices 1a and 1b with using transmission of a synchronization signal in the form of the predetermined bit pattern. However, for simplicity and clarity, the description for the processes for attaining the synchronization is omitted from the following description. As shown in FIG. 6, the format of each transmission data signal includes holding time data in the header, followed by transmission data.

Before the communication is performed, a user of the communication device 1a sets his/her desired holding time Ta through manipulating the dial unit 39a. The holding time data is stored in the memory unit 40a. Similarly, another user of the communication device 1b sets his/her desired holding time Tb through manipulating the dial unit 39b. The holding time data is stored in the memory unit 40b.

First, the process for the communication device 1a will be described with reference to FIG. 4(a).

At the beginning of the process, the control unit 38a outputs a frequency hop instruction signal to the spread code series generator 26a. In 5101, the spread code series generator 26a selects a spread code that appears in the hopping pattern table 35a next to a spread code corresponding to the current frequency. The spread code series generator 26a outputs the selected spread code to the frequency synthesizer 28a. It is noted that the generator 26a outputs the first spread code S1 in S101 of the first routine. As a result, the frequency synthesizer 28 produces a frequency-hopping signal whose frequency corresponds to the supplied spread code.

The control unit 38a then waits in S102 until the prescribed occupied time t elapses after the frequency has hopped to the current frequency. To accomplish this, the control unit 33a reads data of the prescribed occupied time t from the memory unit 40a, sets the timer unit 41a to this occupied time t, and starts the timer 41a to count down the time t. The control unit 38a determines that the time has elapsed when the timer unit 41a reaches zero. The control unit 38a continues monitoring the timer unit 41a in S102 until the occupied time t has elapsed ("yes" in S102), at which time the current frequency of the frequency-hopping signal becomes stable.

Next, data of the holding time Ta is read from the memory unit 40a, and the timer unit 41a is set to the time Ta in S103. The timer unit 41a begins counting down a time length (Ta−t) which is obtained by subtracting the occupied time t from the holding time Ta.

The data controller 62a creates transmission data based on the holding time Ta and transmits that data to the communication device 1b in S104. More specifically, the data controller 62a receives data from the data input/output unit such as the telephone circuit, and creates transmission data for the time length (Ta−t). The transmission data is then modulated at the primary modulator 60a, and inputted into the transmission data input terminal 20a. At the same time, the holding time data is outputted from the control unit 38a to the primary modulator 37a where the holding time data is modulated. The modulated holding time data is added to the header of the transmission data at the data adding device 36a as shown in FIG. 6. The transmission data with the holding time indicating header is sent through the up. converter 22a, the amplifier 30a, and the switching device 32a, before being transmitted through the antenna 33a to the communication device 1b. The transmission is determined to be complete when the timer unit 41a reaches zero.

After transmission has completed, the control unit 38a outputs a frequency hop instruction signal to the spread code series generator 26a in S107. As a result, the frequency of the frequency-hopping signal is hopped to a frequency which corresponds to a spread code that appears in the table 35 next to the latest-used spread code. The control unit 38a then determines whether the prescribed occupied time t has elapsed in S108, checking repeatedly until the time t has elapsed ("yes" in S108). When the occupied time t elapses, the newly-hopped frequency becomes stable, and the communication device 1a begins receiving reception data from the communication device 1b in steps S110–S112.

That is, reception signals transmitted from the communication device 1b are received at the antenna 33a of the communication device 1a. The reception signals pass through the switching device 32a, the amplifier 31a, the down converter 29a, and the demodulator 34a, before being inputted into the control unit 38a. The control unit 38a reads the holding time data from the header of the reception data in S110. The holding time data indicates a holding time Tb which has been set by the dial unit 39b in the communication device 1b. In S111, the timer unit 41a is set to the holding time Tb. The timer unit 41a begins counting down a time length (Tb−t) which is obtained by subtracting the occupied time t from the holding time Tb. The remaining data is then received in S112. The received data is inputted to the data controller 62 through the terminal 21. The reception data is supplied to the data input/output unit such as the telephone circuit. When the timer unit 41a reaches zero, all the data is determined to have been received. The process is repeated from step S101.

Next, the process for the communication device 1b will be described. The description will be brief since the process for the communication device 1b is almost the same as that for the communication device 1a except that the order of transmission and reception is reversed.

At the beginning of the process, and at the same time as the execution of S101 by the communication device 1a, the control unit 38b outputs a frequency hop instruction signal to the spread code series generator 26b, causing the communication device 1b to hop in S201 to the same frequency as the communication device 1a. Simultaneously with S102 of the process for the communication device 1a, the control unit 38b determines whether the occupied time t has elapsed in S202, checking repeatedly until the time t has elapsed ("yes" in S202). Reception data is then received from the communication device 1b in S204–S206.

That is, in S204, the control unit 38b reads the holding time data attached to the received data. In S205, the timer unit 41b is set to the holding time Ta, indicated by the holding time data, which time has been set by the dial unit 39a in the communication device 1a. The timer unit 41b begins counting down the time length (Ta−t). The remaining data is then received in S206.

After reception has completed, the control unit 38b outputs a frequency hop instruction signal to the spread code series generator 26b, causing the communication device 1b to hop in S207 to the same frequency as the communication device 1a in 6107. After the occupied time t has elapsed ("yes" in S208), the communication device 1b transmits transmission data to the communication device 1a in S209–S210.

That is, in S209, the control unit 38b sets the timer unit 41b to the holding time Tb which has been set by the dial unit 39b. The timer unit 41b begins counting down the time length (Tb−t). Transmission data is created based on the holding time Tb, and the transmission data and the holding time data is transmitted to the communication device 1a in S210 in the same manner as in S104. After the transmission has completed, the completion of the transmission is determined when the timer unit 41b reaches zero. Then, the process is repeated from S201.

Figure 5:
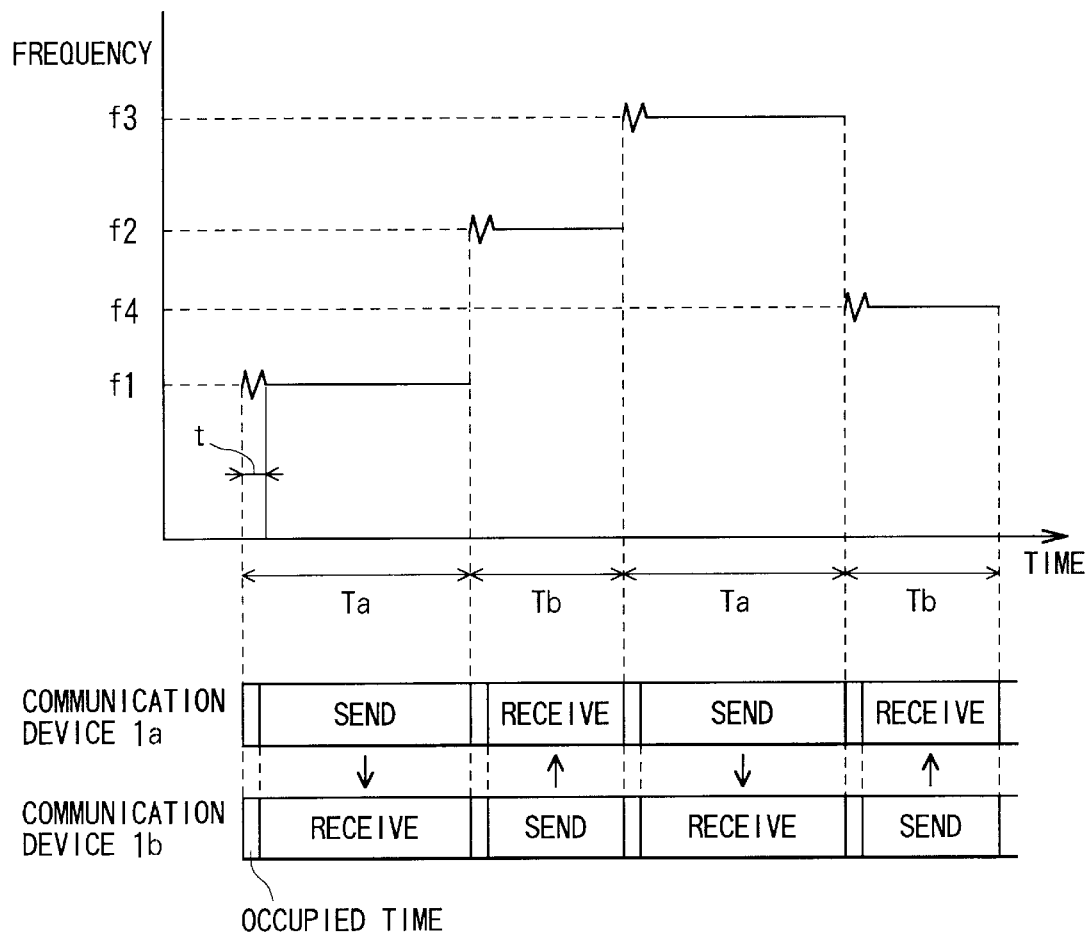
FIG. 5 is a diagram showing the timing for wireless communication performed in the first embodiment.

FIG. 5 shows a timing chart of the bi-directional communication attained between the communication devices 1a and 1b. As can be seen from the diagram, when the devices hop to a frequency f1, the communication device 1a transmits data to the communication device 1b during the holding time Ta which is set at the communication device 1a. Then, the frequency hops from the frequency f1 to another frequency f2. At the frequency f2, the communication device 1b transmits data to the communication device 1b during the holding time Tb which is set at the communication device 1b. Then, the frequency hops from the frequency f2 to another frequency f3. At the frequency f3, the communication device 1a again sends data to the communication device 1b during the holding time Ta. It is noted that the frequency hops to the frequencies f1, f2, f3, . . . when the spread code generator 26 outputs the spread codes S1, S2, S3, . . . selected from the hopping pattern table 35.

It is apparent from the above description that the holding time length is determined by a communication device which is in a transmitting time slot. In addition, each of the holding time lengths Ta and Tb includes the occupied time t therein. The length of time possible for performing data communication is equal to a time length obtained by subtracting the occupied time t from the holding time Ta or Tb. According to the present embodiment, the control unit 38 serves to control the holding time T through the processes of S103 and S104, S110 and S111, S204 and S205, and S209 and S210. The user can freely manipulate the dial unit 39 in the control unit 38. The user can increase the length of the holding time T, thereby decreasing the ratio of the occupied time t with respect to the holding time T and increasing the transfer rate. The user can also decrease the length of the holding time T, thereby increasing the total number the frequency hops in a single communication. This will increase privacy or secrecy of the communication contents.

Various modifications for the present embodiment will be described below.

Figure 8:
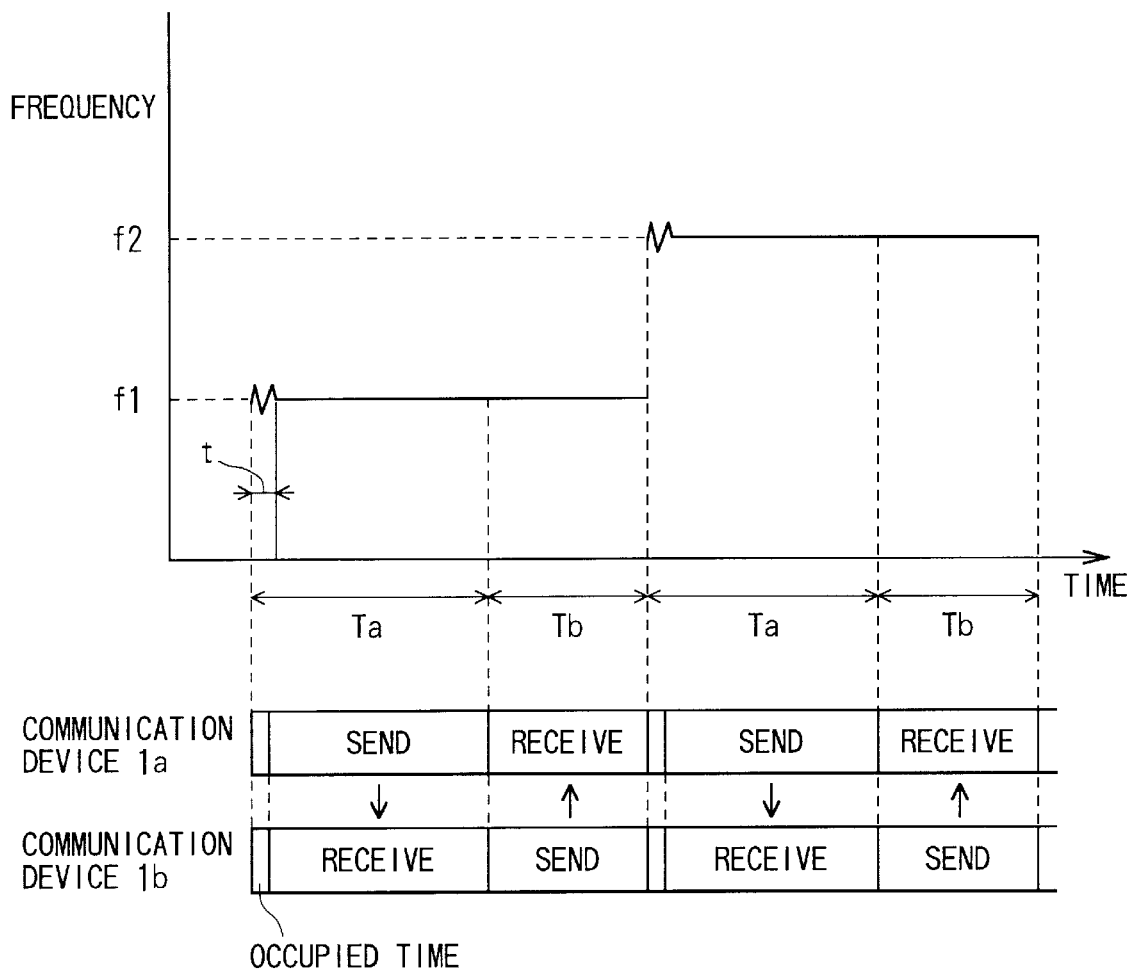
FIG. 8 is a diagram showing the timing for wireless communication performed in the modification of the first embodiment.

A first modification is shown in FIGS. 7(a) and 7(b) and FIG. 8. In this modification, the processes of S107 and S108 shown in FIG. 4(a) for the communication device 1a are replaced with processes of S107' for switching from transmission to reception. The processes of S207 and S208 shown in FIG. 4(b) for the communication device 1b are replaced with processes of S207' for switching from reception to transmission. More specifically, as shown in FIG. 7(a), the communication device 1a hops to a first frequency f1 in S101; transmits data at that frequency f1 in S102–S104; and then receives data at the same frequency f1 in S110–S112. Then, the same operations are performed repeatedly through S101 through S112 while repeatedly hopping-the frequency. As shown in FIG. 7(b), the communication device 1b receives data at the same frequency f1 in S202–S206; and then transmits data also at the same frequency f1 in 5209–S210. In short, according to this modification, as shown in FIG. 8, hopping is performed once for every cycle of transmission and reception. That is, bi-directional communication is performed during the total time Ta and Tb at each frequency. This modification has the same effect as that obtained in the above-described embodiment.

A second modification for the present embodiment will be described below.

According to the present modification, the holding time T is set automatically by the communication device 1 according to a type of data to be transmitted. That is, according to this modification, in S103 of the process for the communication device 1a, the timer unit 41a is automatically set to a holding time $T_{VO}$ when the data to be transmitted is voice data (telephonic data), and is set to a holding time $T_{FA}$ when the data to be transmitted is facsimile data. It is noted that $T_{FA}$ is set to be longer than $T_{VO}$ and not to exceed the maximum limit predetermined for the wireless communication method.

In this modification, when the data controller 62 receives transmission data from the data input/output unit such as the telephone circuit, the data controller 62 detects whether or not the received data contains CNG signals, for example. The data controller 62 supplies detection data indicative of the detected result to the control unit 38. When the detection data indicates that the transmission data contains CNG signals, because the data is considered facsimile data, the control unit 38 sets the timer unit 41a to $T_{FA}$ in S103. When the detection data indicates that the transmission data does not contain CNG signals, because the data is considered voice data, the control unit 38 sets the timer unit 41a to $T_{VO}$ in S103.

Especially when the communication device 1 is used both for a telephone and a facsimile machine, the control unit 38 ordinarily sets the timer unit 41a to $T_{VO}$ in S103. The control unit 38 sets the timer unit 41a to $T_{VA}$ only when a facsimile start button is pushed for transmitting facsimile data.

Thus, the holding time $T_{FA}$ for transmission of facsimile data is set longer than the holding time $T_{VO}$ for transmission of voice data. This is because facsimile data includes a comparatively large amount of data, and usually requires an increased transfer rate more than increased privacy, whereas voice data includes a comparatively small amount of data and usually requires increased privacy more than an increased transfer rate. Thus, by changing the holding time length to a value appropriate for the type of data being transmitted and received, required property, i.e. either the transfer rate or the privacy, can be improved.

Alternatively, the holding time T may be set automatically by the communication device 1 according to a type of the communication device 1. More specifically, in S103 of the process for the communication device 1a, the control unit 38a may automatically set the timer unit 41a to a holding time $T_{FA}$ when the device 1a is a facsimile or to the other holding time $T_{VO}$ when the device 1a is a telephone. Then, in S104, the control unit 38a produces an ID signal indicative of the type of the communication device 1a, and adds the ID signal to the transmission data in place of the holding time data. In this case, the communication device 1b determines the type of the communication device 1a in S204 based on the received ID signal. In S205, therefore, the control unit 38b sets the timer unit 41b to either $T_{FA}$ or $T_{VO}$ based on the determined result.

Thus, by changing the holding time length to a value appropriate for the type of data being transmitted and received, required property, i.e., either the transfer rate or privacy, can be improved.

Alternatively, the memory unit 40 may previously store therein a holding time changing table containing data of a randomly-arranged plurality of holding time lengths T. The control unit 38a may read in S103 a holding time value in order from the table every time a new bidirectional communication process is begun. The control unit 38a uses the selected holding time for the current communication session. In this way, the currently-used holding time will always be different from the previously-used holding time.

Alternatively, the holding time length T may be changed in S103 using the hopping pattern table 35 as shown in the Table 2 below.

TABLE 2

| Series No. | 1 | 2 | 3 | 4 | ... |
|---|---|---|---|---|---|
| Spread code | S1 | S2 | S3 | S4 | ... |
| Holding time | T1 | T2 | T3 | T4 | ... |

This hopping table 35 is prepared through combining the hopping table 35 shown in the Table 1 with the above-described holding time changing table. In this case, every time the frequency hops, the holding time for the frequency also changes. With this method, it will be extremely difficult for a third party to intercept communication data because not only does the frequency change but also the holding time changes. Hence, privacy or secrecy can be further improved.

Next, a wireless communication system according to a second embodiment of the present invention will be described while referring to FIGS. 9(a) and 9(b) and 10 wherein like parts and components are designated by the same reference numerals to avoid duplicating description.

The structure of the wireless communication device 1 of the second embodiment is the same as that of the wireless communication device of the first embodiment shown in FIG. 3. Therefore, a description of that structure will be omitted.

According to the present embodiment, the memory unit 40 previously stores, in its prescribed area, data of a basic holding time $T_H$ of a fixed length. The memory unit 40 further stores therein a holding time changing pattern as shown in Table 3 below in its another prescribed area.

TABLE 3

| Number | 1 | 2 | 3 | 4 | 5 | 6 | ... | k |
|---|---|---|---|---|---|---|---|---|
| Pattern of change (hop data) | Stay→ | Change→ | Change→ | Stay→ | Stay→ | Change→ | ···→ | Change |

More specifically, in one communication device 1a, the memory unit 40a previously stores therein data of the basic holding time $T_H$ of the fixed length and the holding time changing pattern. Similarly, also in the communication device 1b, the memory unit 40b stores therein the holding time $T_H$ and the holding time changing pattern. It is noted that the holding time changing pattern stored in the communication device 1b may be the same as or different from that stored in the communication device 1a.

Figure 11:
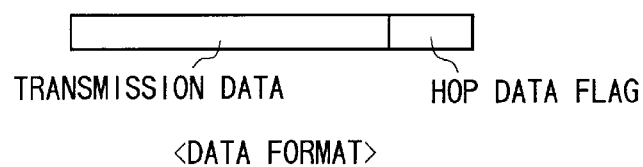
FIG. 11 is an explanatory diagram of a transmission data format used in the second embodiment.

It is further noted that according to the present embodiment, the transmission data signal is created by the data adding device 36 in a format as shown in FIG. 11. That is, a hop data flag is added to an end of the transmission data in accordance with the holding time changing pattern as will be described below.

Next, bi-directional communication between the two communication devices 1a and 1b will be described with reference to the flowcharts in FIGS. 9(a) and 9(b) and the timing-chart of FIG. 10.

It is noted that steps in FIGS. 9(a) and 9(b), whose final two digits match with each other, are performed at about the same time. It is further noted that in each communication step, synchronization is attained between the communication devices 1a and 1b through transmission of a synchronization signal in the form of the predetermined bit pattern. The description for the synchronization attaining operation is, however, omitted from the following description for the simplicity and clarity.

First, the process of the communication device 1a will be described below with reference to FIG. 9(a).

At the beginning of the process, the control unit 38a outputs a frequency hop instruction signal to the spread code series generator 26a in S301. The spread code series generator 26a selects a spread code appearing in the hopping table 35 next to the latest-selected spread code. It is noted that the spread code SI is selected in S301 during the first routine. The generator 26a outputs the selected spread code to the frequency synthesizer 28, which in turn produces a frequency-hopping signal whose frequency corresponds to the selected spread code. In this case, the frequency synthesizer 28 outputs a frequency-hopping signal with frequency f1.

The control unit 38a then waits until the occupied time t has elapsed in S302. When the occupied time t has elapsed ("yes" in S302), the current frequency becomes stable. Then, the control unit 38a sets a hop data flag in S303 according to the holding time changing pattern of Table 3 stored in the memory unit 40a. That is, the hop data flag is set based on current hop data in the holding time changing pattern. For example, in S303 of the first routine, the hop data flag is set based on hop data appearing at the number "1" in the Table 3. In S303 of the second routine, the hop data flag is set based on hop data appearing at the number "2". Thus, in S303 of the n-th routine where 1≦n≦k, the hop data flag is set based on hop data appearing at the number "n". It is noted that the hop data flag is set to "on" if the current hop data in the table is "change" or set to "off" if the current hop data in the table is "stay." In this example, because "stay" is stored at the number "1", the hop data flag is set to "off". Also in S303, the timer unit 41a is set to the basic holding time $T_H$, data of which is stored in the memory unit 40a.

It is noted that after the hop data corresponding to number "1" is thus used in S303 of the first routine, then the hop data corresponding to number "2" is set to the hop data flag in S303 of the next routine. After the hop data for number "k" is used, the hop data starts over at number "1". The data controller 62a creates transmission data based on the basic holding time $T_H$, and transmits the transmission data to the communication device 1b in S304. More specifically, the data controller 62a creates transmission data for the time length of the basic holding time $T_H$. The transmission data is modulated by the primary modulator 60a, and inputted into the transmission data input terminal 20a. At the same time, the control unit 38a outputs the hop data flag to the primary modulator 37a where it is modulated. The modulated hop data flag is then added to the end of the transmission data by the data adding device 36a. The transmission data with the hop data flag shown in FIG. 11 is sent through the up converter 22a, the amplifier 30a, and the switching device 32a, before being transmitted from the antenna 33a to the communication device 1b. The transmission is determined to be complete when the timer unit 41a reaches zero.

After transmission has completed, in S305 the control unit 38a reads the hop data flag that has been set in S303. If the hop data flag is "on," a spread code appearing in the spread code series next to the latest-selected spread code is selected, and the frequency of the frequency-hopping signal is hopped to the corresponding frequency in S306. The control unit 38a then determines whether the occupied time t has elapsed in S307, checking repeatedly until the time t has elapsed ("yes" in S307). When the occupied time t elapses, the newly-set frequency becomes stable, and the communication device 1a begins receiving data from the communication device 1b in S309. When, in S305 the hop data flag is "off," on the other hand, the process skips from S305 to S309 without updating the spread code and without hopping to the next frequency. The communication device 1a therefore begins receiving data from the communication device 1b in S309 at the unchanged frequency.

Signals received by the antenna 33a pass through the switching device 32a, the amplifier 31a, the down converter 29a, and the demodulator 34a and are inputted into the control unit 38a. The control unit 38a reads the hop data flag from the received data and determines in S310 whether the flag is "on" or "off." If the hop data flag is "on," the process returns to S301, in which step the next spread code in the spread code series is generated, and the frequency is hopped to the next frequency. The process then continues as described above from S302. However, if the hop data flag in S310 is "off," the process proceeds to S303 without updating the spread code and without hopping to a new frequency.

Next, the process for the communication device 1b will be described below with reference to FIG. 9(b). The description will be brief since the process is almost the same as that for the communication device 1a except that the order of transmission and reception is reversed.

At the beginning of the process, and at the same time as the execution of S301 in the process for the communication device 1a, the control unit 38b outputs a frequency hop instruction signal to the spread code series generator 26b, causing the communication device 1b to hop in S401 to the same frequency hopped to by the communication device 1a. Simultaneously with S302 of the process for the communication device 1a, the control unit 38b determines whether the occupied time t has elapsed in S402, checking repeatedly until the time t has elapsed ("yes" in S402). Data is then received from the communication device 1a in S404.

The control unit 38b reads the hop data flag from the received data, and determines in S405 whether the flag is "on" or "off." If the hop data flag is "on," the next spread code in the spread code series is generated, and the frequency is hopped to the corresponding frequency in S406. When the control unit 38b determines that the occupied time t has elapsed ("yes" in S407), the process proceeds to S408. When, in S405 the hop data flag is "off," on the other hand, the process skips from S405 to S408 without updating the spread code and without hopping to a new frequency.

In S408, the control unit 38b creates the hop data flag according to the holding time changing pattern (Table 3, for example) stored in the memory unit 40b of the communication device 1b. That is, the hop data flag is set to "on" when the current hop data in the table is "change" or set to "off" when the current hop data in the table is "stay" in the same manner as in the communication device 1a in S303.

The data controller 62b creates transmission data based on the temporary holding time $T_H$ and transmits the data in S409. After transmission has completed, in S410 the control unit 38b reads the hop data flag that has been set in S408. If the hop data flag is "on," the process returns to S401 in which step the next spread code in the spread code series is generated, and the frequency is hopped to the corresponding frequency. The process continues as described above from S402. However, if the hop data flag is "off," the process proceeds to S404 without updating the spread code and without hopping to a new frequency.

Figure 10:
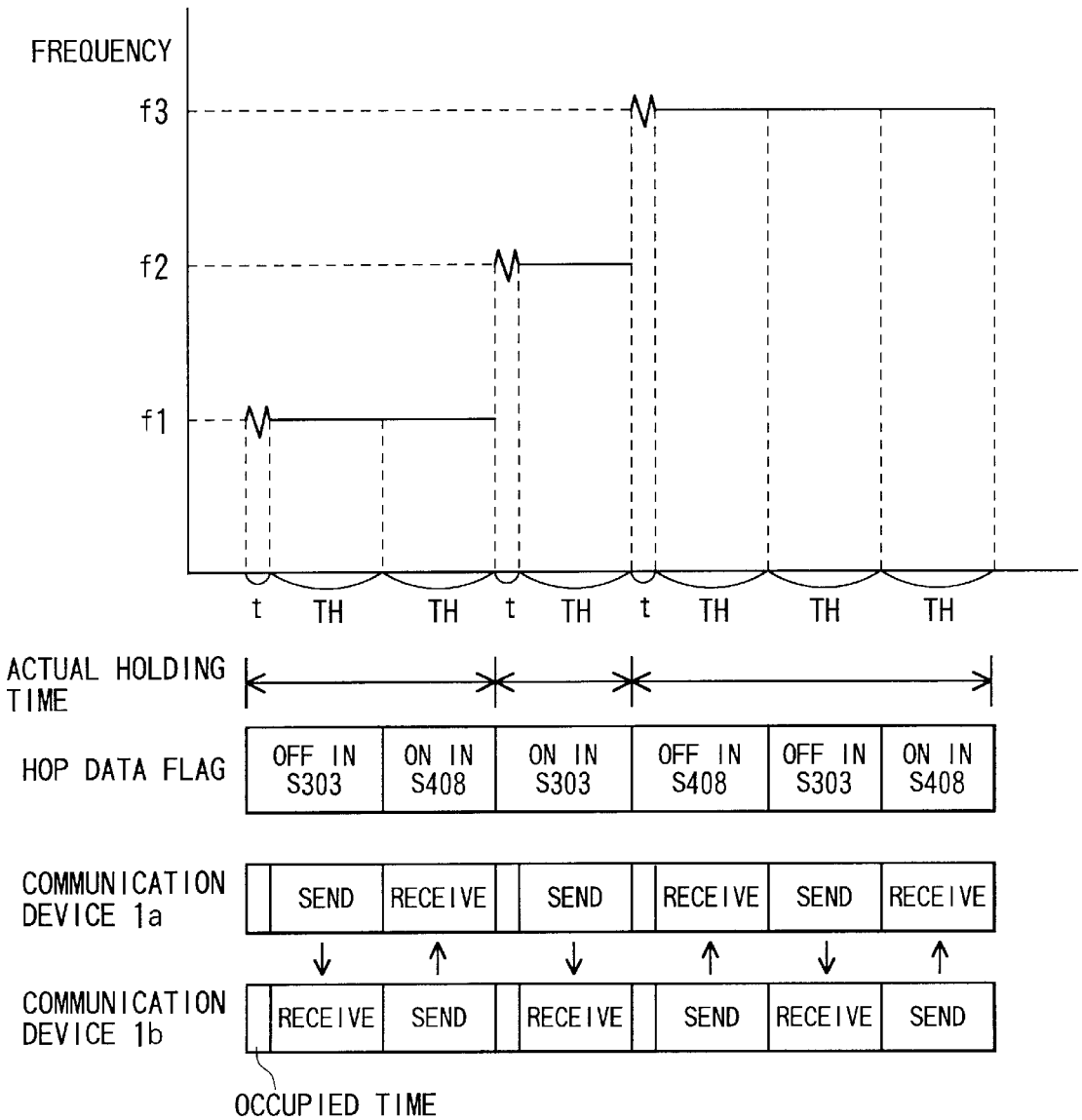
FIG. 10 is a diagram showing the timing for wireless communication performed in the second embodiment.

FIG. 10 shows the timing chart of operations during the above-described bidirectional communication attained between the communication devices 1a and 1b. As can be seen from the diagram, the devices 1a and 1b simultaneously hop to the frequency f1 in S301 and S401. Because the hop data for the number "1" in the holding time changing pattern (Table 3) of the communication device 1a is "stay," the communication device 1a sets the hop data flag to "off" in S303 of the first routine. Accordingly, after the communication device 1a transmits data to the communication device 1b at the frequency f1 for the holding time $T_H$, the frequency f1 is maintained unchanged.

In this example of FIG. 10, it is assumed that the hop data for the number "1" in the holding time changing pattern stored in the communication device 1b is "change." In this case, the communication device 1b sets the data flag to "on" in S408 of the first routine. Thus, after the communication device 1b transmits data to the communication device 1a at the frequency f1 for the basic holding time $T_H$ in S409, the frequency is hopped to the frequency f2 in S401.

Thus, the hop data flag is set to "on" or "off" according to the holding time changing pattern, and the decision to hop to the next frequency or not is determined by the hop data flag. Accordingly, the hop data flag determines an actual holding time during which each frequency is held. In this example of FIG. 10, the frequency f1 is held for the actual holding time of $2T_H+t$, and the frequency f2 is held for the actual holding time of $T_H+t$.

As described above, in the wireless communication system of the present embodiment, it will become extremely difficult for a third party to intercept communication signals, because not only is the frequency being changed, but also the actual holding time length is being changed. Hence, privacy is enhanced.

A modification of the second embodiment will be described below.

The wireless communication system of the modification is designed to perform transmission using a packet exchange system. That is, each communication device 1 is provided with a buffer memory for temporarily storing transmission data. The data controller 62 is designed to divide the stored transmission data into equal blocks or packets, before transmitting these packets to a remote communication device 1.

The communication device 1 of the present modification stores therein data of the basic holding time $T_H$ in the memory unit 40a as each packet length $L_{PAC}$. The communication device 1 also creates and stores a changing pattern shown in Table 4 below in the memory unit 40.

TABLE 4

| Changing pattern | ...→Change→Stay→......→Stay→Change→... |
|---|---|
| | Repeat (n-1) times |

The changing pattern is for setting the possible transmission time (i.e., a time length obtained by subtracting the occupied time t from the actual holding time) to be an integral multiple of the basic holding time $T_H$. In other words, the possible communication time is set to $n \times T_H$, where n is an integer. The changing pattern is also for setting the actual holding time $(t+n \times T_H)$ not to exceed the predetermined maximum time limit for the frequency hopping wireless communications.

According to the present modification, when the user at the communication device 1a desires to transmit data to the communication device 1b through the packet exchange system, the communication device 1a is controlled as described below.

That is, in FIG. 9(a) of the second embodiment, the communication device 1a is designed to perform the reception process in S309 and S310 when the hop data flag is set to "off" In S305. Contrarily, according to the present modification, when the hop data flag is "off" in S305, the program proceeds to ② in FIG. 9(a), and continues transmission processing from S303. Similarly, the communication device 1b is controlled so that when the hop data flag is "off" in S405, the program proceeds to ④ in FIG. 9(b), and continues reception processing from S404. The remaining steps are the same as those of the second embodiment.

Figure 12:
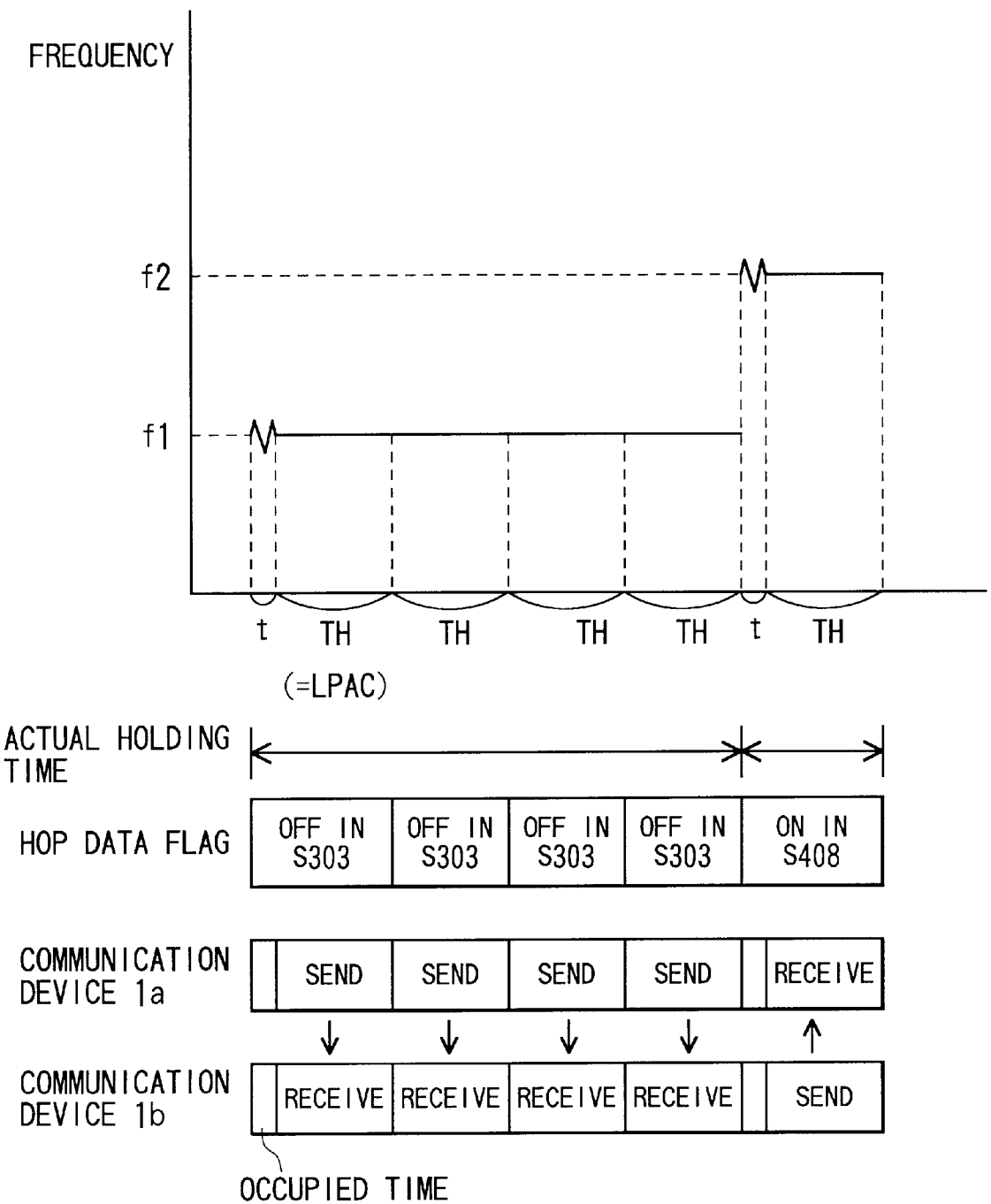
FIG. 12 is a diagram showing the timing for wireless communication performed in a modification of the second embodiment.

FIG. 12 shows a timing chart indicative of the operations performed in the present modification. It is apparent that the possible communication time (i.e., the time length obtained by subtracting the occupied time t from the actual holding time) is set n times the packet length $L_{PAC}$ (=$T_H$) (four times, in this case).

Figure 13:
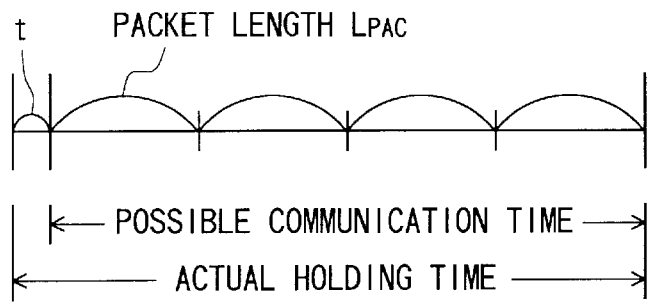
FIGS. 13(a) through 13(c) are explanatory diagrams showing the relationship between the holding time and the packet length.
Figure 13:
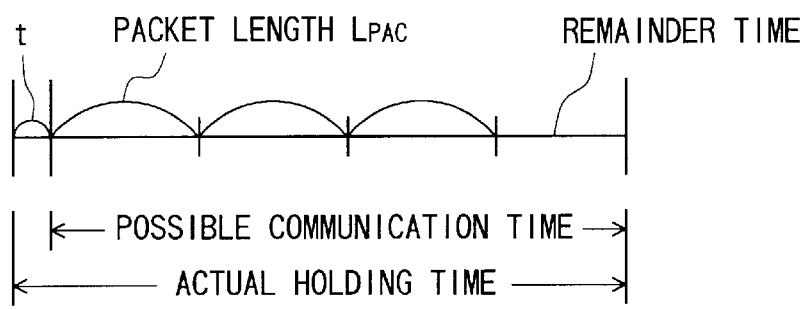
Figure 13:
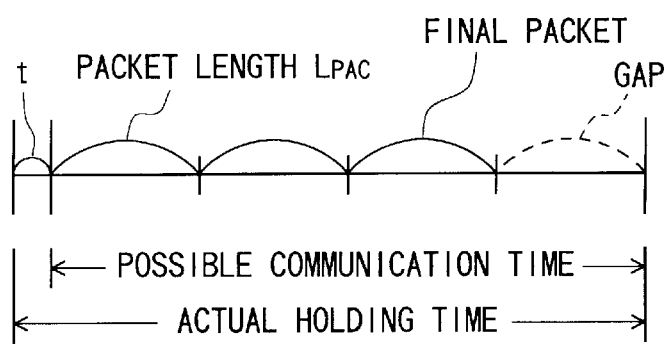

It is noted that if the possible communication time is different from n times the packet length $L_{PAC}$, then remainder time will be produced as shown in FIG. 13(b), during which data cannot be transferred. Accordingly, the transfer rate cannot be improved sufficiently. Contrarily, because the possible communication time is set n times the packet length $L_{PAC}$ in the present modification, then no remainder time will be produced, as shown in FIG. 13(a), and the transfer rate can be sufficiently increased.

It is additionally noted that when the total number of packets that are desired to be sent is m, it is desirable to set the value of n so that m=n×p, where p is an integer. If this relation between m and n is not satisfied, no data will be transferred during a gap of at least one packet length $L_{PAC}$ after the last packet has been sent, as shown in FIG. 13(c). As a result, the transfer rate cannot be sufficiently increased. However, if the relationship between m and n described above is met, a gap in transmission will not occur, and the transfer rate can be sufficiently increased.

A third embodiment will be described below with reference to FIGS. 14, 15, and 20.

According to the third embodiment, the current frequency is hopped to the next frequency when the communication under the current frequency is detected to have a high error rate.

More specifically, according to the communication device 1 of the present embodiment, when receiving reception data from a remote communication device, the error rate of the received signals is first detected. The detected error rate is then compared with a predetermined first error rate reference value which is stored in the communication device 1. When the detected error rate becomes higher than the reference value, the current frequency is changed to the next frequency according to the hopping pattern table 35.

Figure 20:
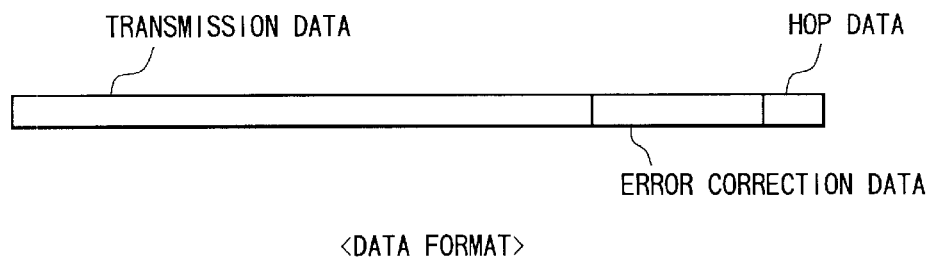
FIG. 20 is a diagram showing the format of data transmitted by the communication device of FIGS. 14, 16, and 17.

According to the third embodiment, the data format of the transmission data signal (reception data signal) is designed as shown in FIG. 20. The transmission data signal is constructed from: transmission data (communication data), i.e., actual data desired to be sent to a remote communication device: error correction data to be used for correcting errors in the transmission data; and hop data indicative of whether or not the frequency is to be hopped. The error correction data is prepared from code data such as a Reed-Solomon code (hereinafter referred to as "RS code"), which is well-known in the art.

Figure 14:
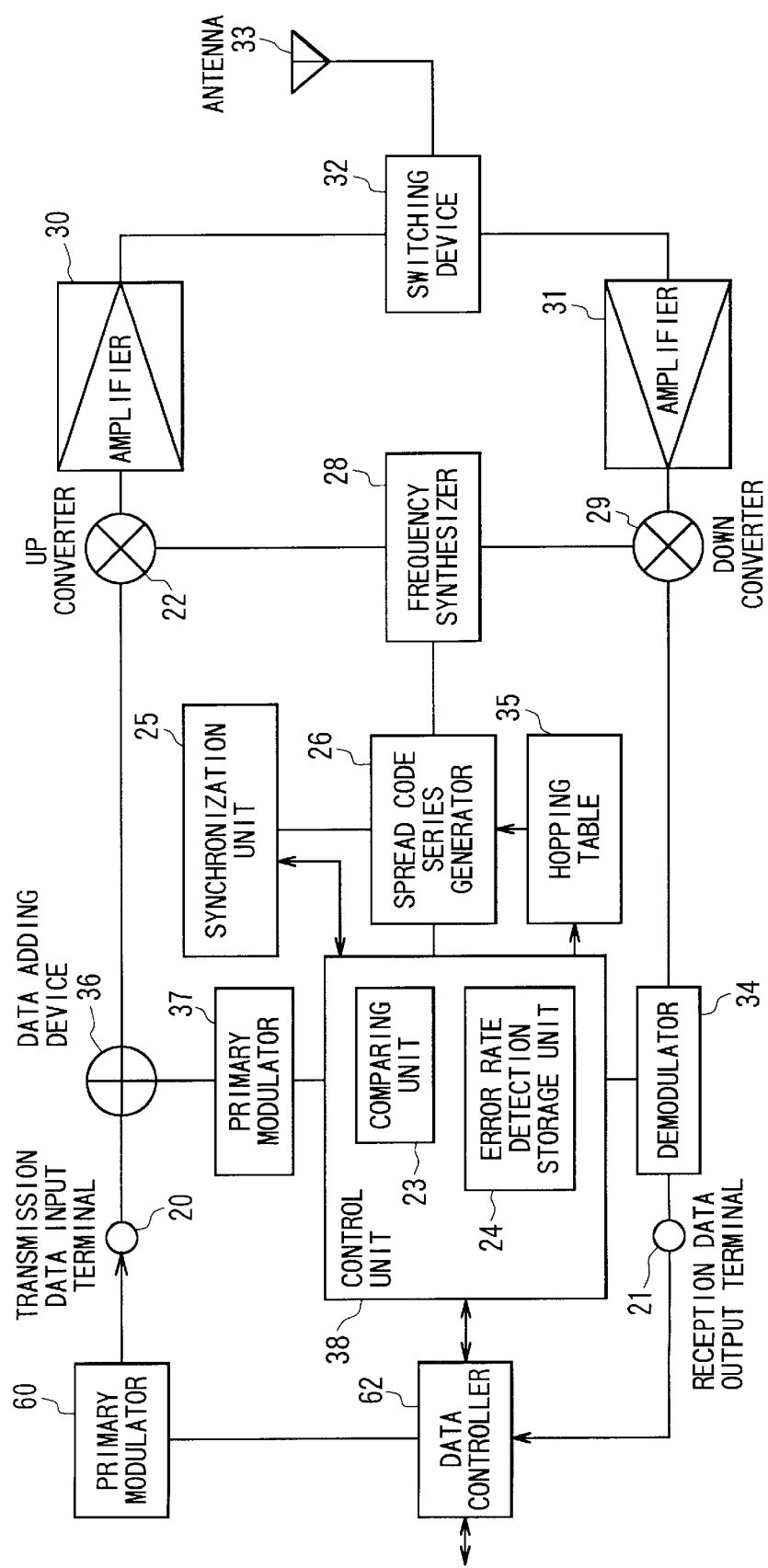
FIG. 14 is a block diagram showing the construction of a communication device of a third embodiment.

According to the present embodiment, the communication device 1 is constructed as shown in FIG. 14. The communication device 1 of the present embodiment is the same as that of the first embodiment except that the control unit 38 is not provided with the dial 39, the memory 40, and the timer 41, but is provided with an error rate detection storage unit 24 and a comparing unit 23. Although not shown in the drawing, the control unit 38 is constructed from a CPU, a ROM, and a RAM.

The error rate detection storage unit 24 is for using the well-known RS code error detection technique to calculate an error rate of received data, which has been transmitted from the remote communication device and inputted from the demodulator 34. The comparing unit 23 previously stores therein a predetermined first reference error rate. The comparing unit 23 is for comparing the calculated error rate of the received data with the predetermined first reference error rate. When the error rate of the received data is higher than the first reference error rate, the comparing unit 23 determines that satisfactory communication is not possible at the current frequency. In this case, the comparing unit 23 will output a frequency hop instruction signal to the spread code series generator 26. On the other hand, when the calculated error rate is equal to or lower than the first reference error rate, the comparing unit 23 determines that it is possible to achieve satisfactory communication at the current frequency. The comparing unit 23 therefore will output, to the spread code series generator 26, a frequency maintain instruction signal indicating that the frequency should be maintained unchanged. It is noted that the comparing unit 23 outputs the frequency hop instruction signal and the frequency maintain instruction signal also to the primary modulator 37.

According to the present embodiment, therefore, when the communication device 1 is in a transmission slot for transmitting transmission data toward a remote communication device, the control unit 38 controls the comparing unit 23 to output the frequency hop instruction signal or the frequency maintain instruction signal to the primary modulator 37. The instruction signals are modulated by the primary modulator 37 and added as the hop data to the transmission data at the data adding device 36 as shown in FIG. 20. The hop data is transmitted to the remote communication device together with transmission data at the current frequency. The control unit 38 also outputs the instruction signal to the spread code series generator 26 so as to update or maintain the frequency of the frequency-hopping signal at the subsequent reception time slot.

During the reception time slot, the control unit 38 receives hop data in reception signals transmitted from the remote communication device 1. When the hop data contains a frequency hop instruction signal, the control unit 35 outputs a frequency hop instruction signal to the spread code series generator 26 so that the next frequency will be used during the subsequent transmission time slot.

It is now assumed that communication devices 1a and 1b, each of which has the structure of FIG. 14, perform bi-directional communication therebetween at a certain frequency f1. In this case, when the communication device 1a detects, in its reception time slot, that the error rate of the reception data at the current frequency f1 is higher than the first reference error rate, the communication device 1a sends, to the communication device 1b, a frequency hop instruction signal as hop data together with transmission data. This data sending operation is performed at the current frequency f1.

Then, the control unit 38a outputs a hop instruction signal to the spread code series generator 26a, thereby controlling the frequency synthesizer 28a to generate signals at the next frequency f2. Simultaneously, the communication device 1b receives the hop instruction data in the reception data. The control unit 38b outputs a hop instruction signal to the spread code series generator 26b, thereby controlling the frequency synthesizer 28b to generate signals at the next frequency f2. Thus, the communication devices 1a and 1b simultaneously hop to the next frequency f2.

Figure 15:
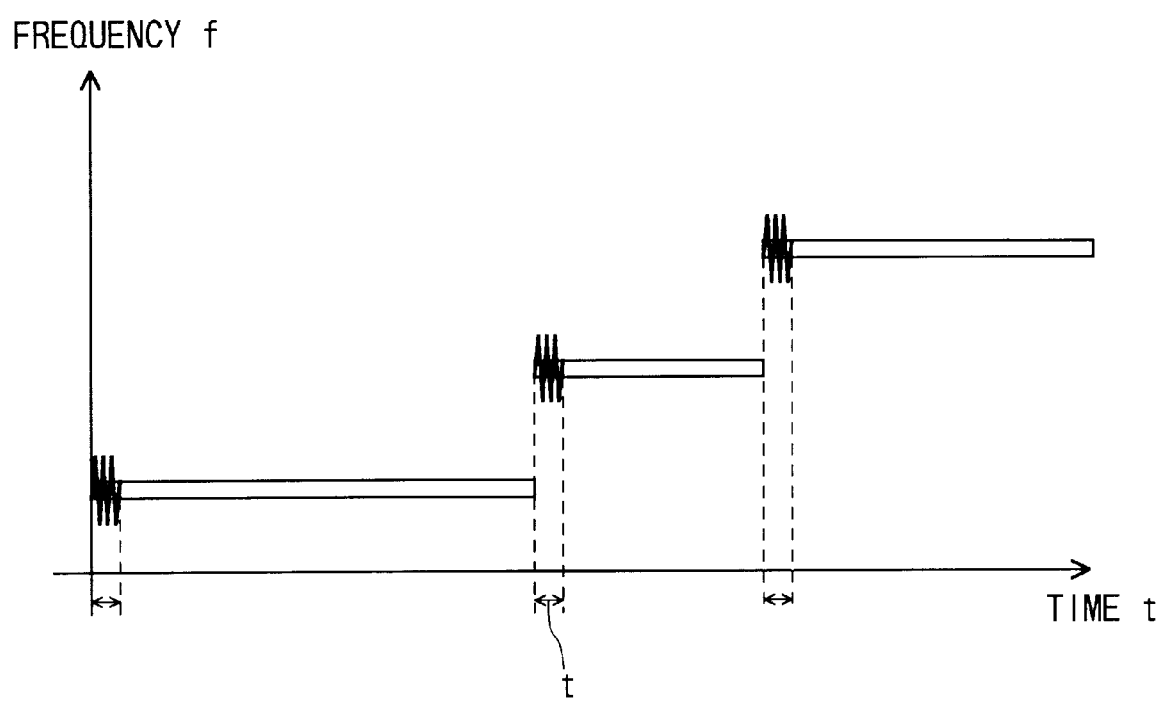
FIG. 15 is a diagram showing the timing for frequency changes performed in the communication device of the third embodiment.

Accordingly, the communication is attained as shown in FIG. 15. As apparent from the drawing, rather than hopping at regular intervals as in the conceivable communication device, the communication devices of the present invention hop to a new frequency only when the error rate caused by interference becomes too high. As a result, the total amount of occupied time t relative to the total holding time is decreased.

In the same manner as in the first and second embodiments, each of the communication devices 1a and 1b repeatedly performs transmission operation and reception operation in alternation. That is, the transmission time slot and the reception time slot are provided in alternation. The reception time slot of the communication device 1b is set to coincide with the transmission time slot of the communication device 1a, and the transmission time slot of the device 1b is set to coincide with the reception time slot of the device 1a. Accordingly, the multiplex communication is attained. Because one frame is constructed from one transmission time slot and one reception time slot, the holding time for one frequency can be set to an integral multiple of a frame. The holding time will therefore change each time the frequency is changed.

As described above, according to the third embodiment, the error rate of the received data is detected. The error rate is then compared to the first reference value. If the error rate is equal to or smaller than the reference value, no change is made; however, if the error rate is higher than the first reference value, the communication device changes the spread code to be outputted from the spread code generator 26, thereby changing the frequency used for transmission and reception. This method enables the device to reduce the number of frequency hops, thereby increasing the transfer rate.

A first modification of the third embodiment will be described below with reference to FIGS. 16 and 18(a), 18(b), and 18(c).

Figure 16:
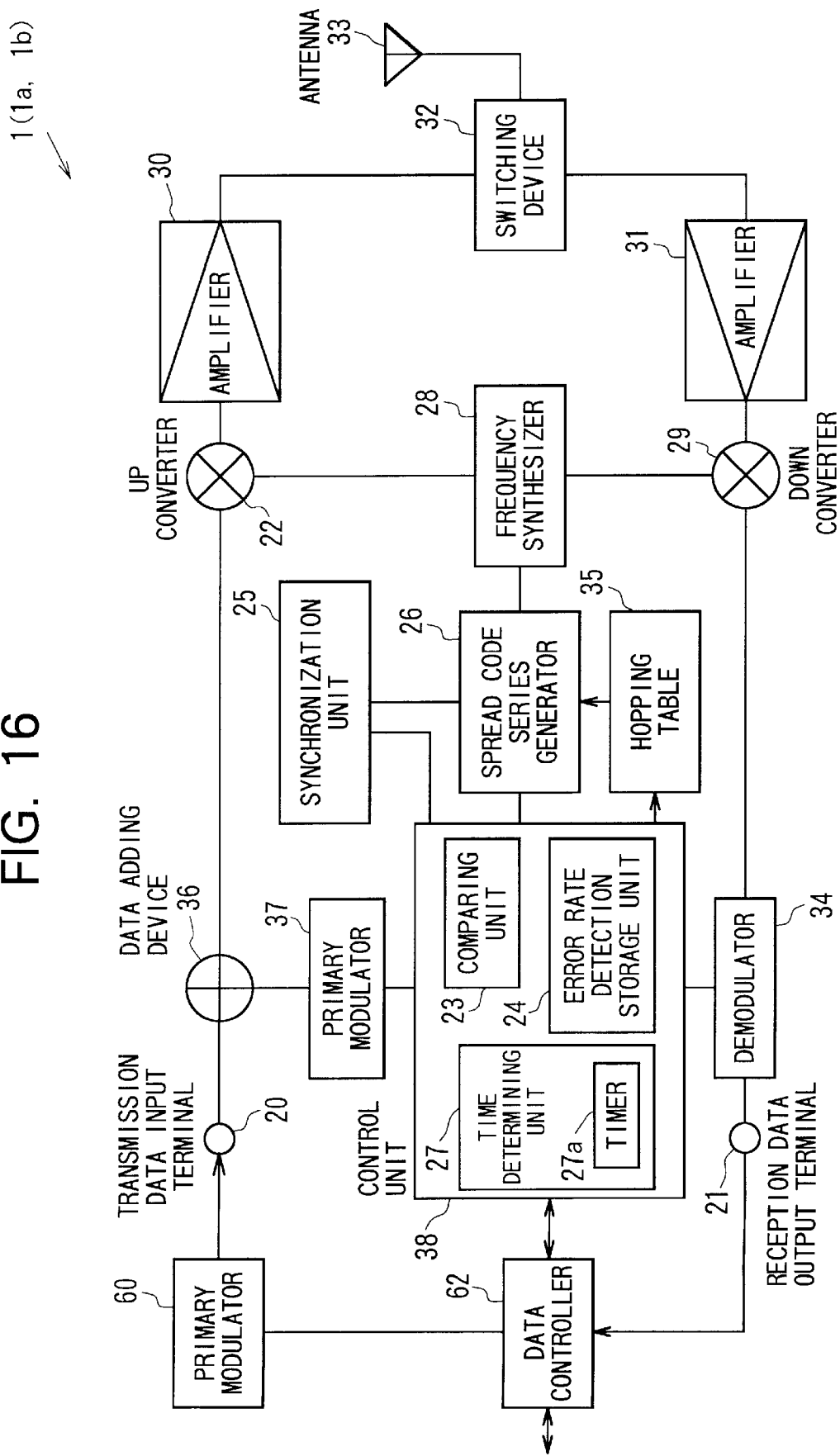
FIG. 16 is a block diagram showing the construction of a communication device of a first modification of the third embodiment.

FIG. 16 shows the structure of the wireless communication device 1 of the present modification. The device of the modification is the same as that of the third embodiment of FIG. 14 except that the control unit 38 includes a time determining unit 27 provided with a timer 27a.

The timer 27a is for starting timing when the control unit 38 outputs a frequency hop instruction signal to the spread code series generator 26. The timer 27a is designed to be reset to zero and to again start timing when another frequency hop instruction signal is outputted.

The time determining unit 27 is for determining whether or not the time counted by the timer 27a becomes longer than a predetermined reference holding time. The reference holding time is smaller than the maximum limit of holding time for the frequency hopping wireless communication method. For example, the reference holding time may be set to several milliseconds, while the predetermined maximum limit is 400 milliseconds. The time determining unit 27 is configured to generate a time up signal when the timer 27a counts the predetermined reference holding time. In other words, the time determining unit 27 generates a time up signal when the predetermined reference holding time lapses after the frequency hop instruction signal has been issued at the latest. When the time up signal is generated, the control unit 38 creates a no good (NG) signal. The NG signal will be sent to the remote communication device as hop data to instruct frequency hopping.

The comparing unit 23 is configured to generate a communication no good (NG) signal when the error rate of the received signal, as detected by the error rate detection storage unit 24, becomes higher than the first reference error rate. The NG signal will be sent to a remote communication device as hop data to instruct frequency hopping. The comparing unit 23 generates a communication good (OK) signal when the error rate is equal to or smaller than the first reference error rate. The OK signal will be sent to the remote communication device as hop data to instruct frequency maintaining.

According to the present modification, when the control unit 38 generates a NG signal, the control unit 38 outputs a NG signal (frequency hop instruction signal) to the primary generator 37. The NG signal is transmitted as hop data to the remote communication device together with transmission data. The control unit 38 also controls the spread code series generator 26 so that communication will be attained with the updated frequency during the subsequent reception time slot.

When a NG signal (frequency hopping instruction) is received as hop data from the remote communication device during a reception time slot, the control unit 38 controls the spread code series generator 26 before performing the subsequent transmission operation. The timer 27a is reset to zero, and then started when the subsequent transmission operation is started with the updated frequency.

According to this modification, the hopping pattern table 35 is constructed from a memory for storing a plurality of different frequencies at respective addresses as shown in Table 5 below.

TABLE 5

| Frequency series | Address no. | 1 | 2 | 3 | 4 | ... n |
|---|---|---|---|---|---|---|
| | Frequencies | f1 | f2 | f3 | f4 | ... fn |

The synthesizer 28 is for producing frequency-hopping signals whose frequency will be changed in the order of f1, f2, . . . , and fn. When the frequency becomes fn, the frequency will be changed again into f1.

The spread code series generator 26 is provided with a memory area formed with a pair of counters 261 and 262. The counter 262 is for being set with one address in the hopping table 35. The counter 261 is for being set with the address number set in the counter 262. The synthesizer 28 is designed to generate a frequency-hopping signal whose frequency is stored in the table 35 at the address whose number is presently set in the counter 261.

Similarly to the above-described third embodiment, the data format for the transmission data (reception data) is as shown in FIG. 20.

Figure 18:
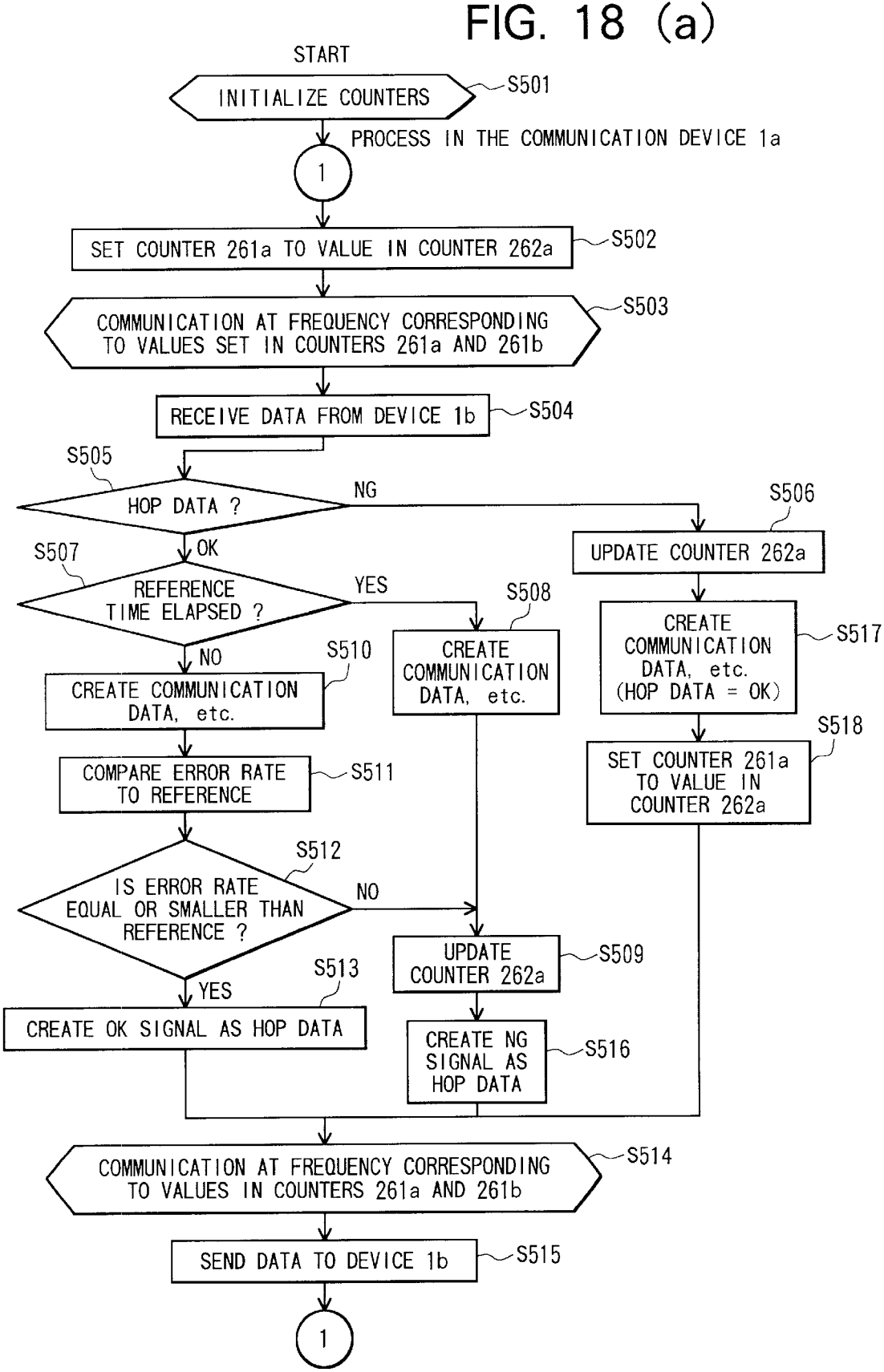
FIGS. 18(a) and 18(b) are flowcharts showing the operations performed in a pair of communication devices each of which has the structure of FIG. 16.
FIG. 18(c) is a flowchart showing relationship between timings of the respective steps in FIGS. 18(a) and 18(b)
Figure 18:
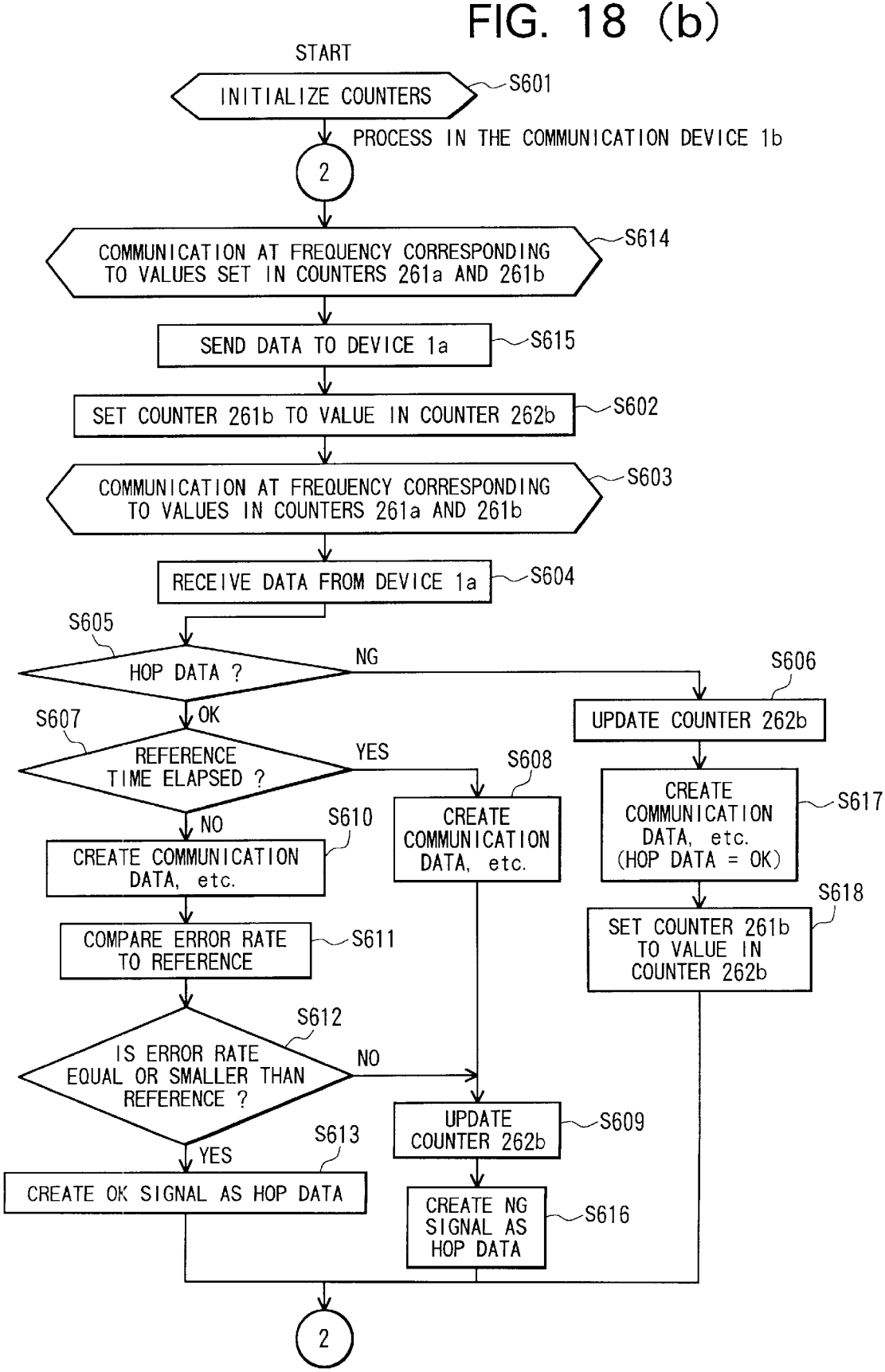
Figure 18:
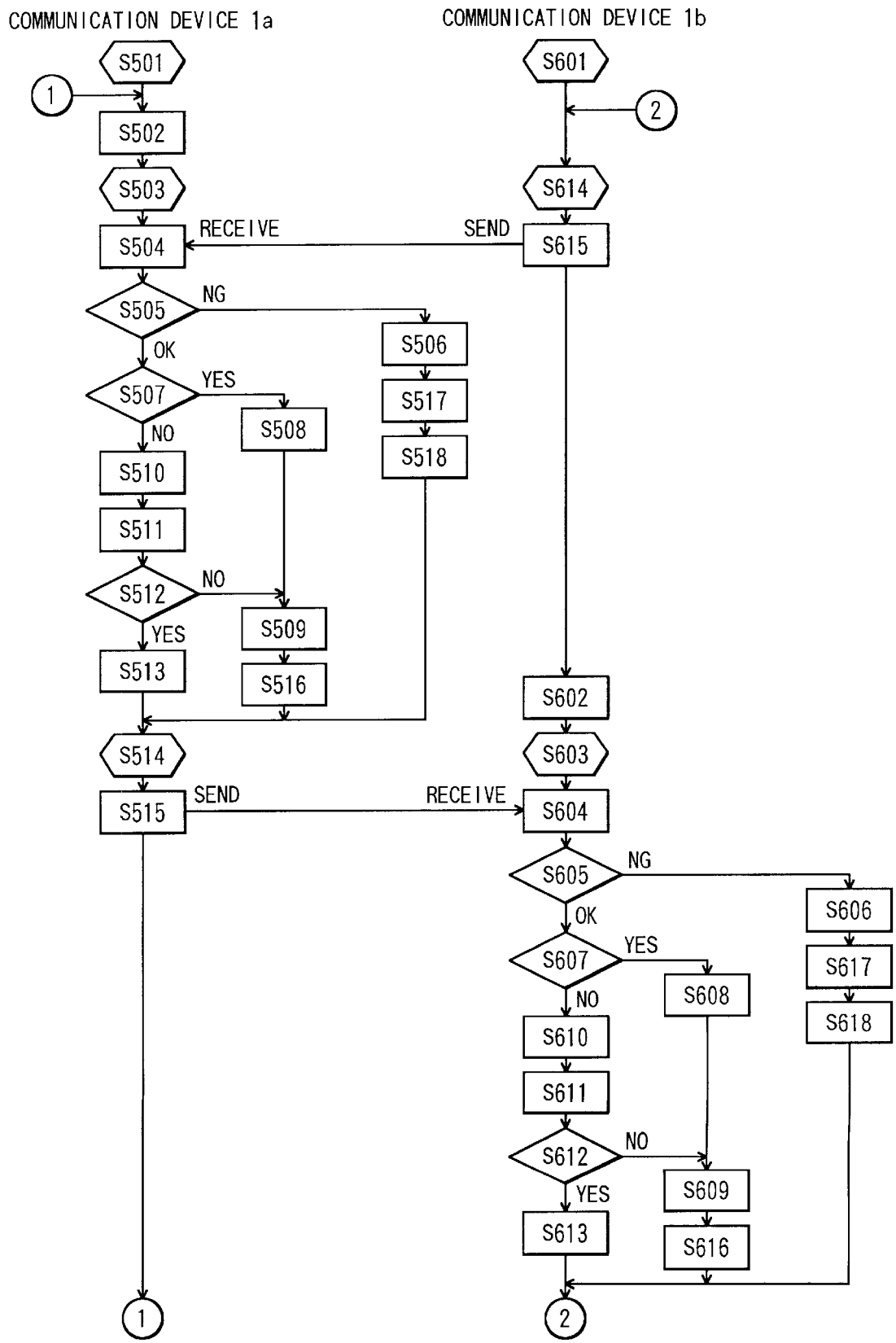

Next, bi-directional communication between two communication devices 1a and 1b will be described with reference to flowcharts of FIGS. 18(a), 18(b), and 18(c). FIG. 18(c) is a flowchart showing relationship between the timings of the respective processes performed at the communication devices 1a and 1b shown in FIGS. 18(a) and 18(b). Each of the communication devices 1a and 1b has the same structure as shown in FIG. 16. Reference numerals of the respective components in the communication devices 1a and 1b are referred to as the same reference numerals in FIG. 16 followed with the reference symbols "a" and "b," respectively. It is noted that in each communication step, synchronization is attained between the devices 1a and 1b through transmission of synchronization signals in the form of the predetermined bit patterns. For simplicity and clarity, the description for the synchronizing processes are omitted from the following description.

At the beginning of the process, the communication devices 1a and 1b simultaneously perform S501 and S601 where the frequency of the frequency-hopping signal (initial carrier wave frequency) is initially set. This operation is performed through initializing the contents of the counters 261a, 262a, 261b, and 262b in the devices 1a and 1b. That is, all the counters 261a. 262a, 261b, and 262b are initialized into the same address number "1".

First, the operation of the communication device 1a will be described with reference to FIGS. 15(a) and 18(c).

In S502, the counter 261a in the communication device 1a is set to the address number presently stored in the counter 262a. Then, in S503, communication is performed between the communication devices 1a and 1b at the frequency corresponding to the address number presently set in the counters 261a and 261b. In this example, the communication device 1a first receives data transmitted from the communication device 1b in S504 as shown in FIG. 18(c). The hop data, which is a flag, is then separated from the received data. If the hop data is determined in S505 as an NG signal, it is determined that the communication device 1b has detected that the error rate has exceeded the first reference error rate in the latest-performed reception operation at the current frequency. Accordingly, the program proceeds to S506 where the counter 262a is updated into data of an address in the table 35 next to the address presently set in the counter 262a. Then, transmission data and error correction data, to be sent to the communication device 1b, are created in S517. At this time, an OK signal is created as hop data. Then, in S518, the counter 261a is set to the address number newly set in the counter 262a in S506.

On the other hand, if the received hop data is determined in S505 as an OK signal, it is determined that the communication device 1b has detected that the error rate has not exceeded the first reference error rate in the latest-performed reception operation at the current frequency. Because it is unnecessary to change the current frequency, the program does not proceed to S506, but proceeds to S507.

In S507, the time determining unit 27 determines whether or not the reference holding time has elapsed from the time when the frequency has been hopped to the current frequency, i.e., the time when the frequency-hopping signal with the current frequency has started to be outputted. If the reference time has elapsed ("yes" in S507), it is determined that the communication has been performed too long with the current frequency and therefore that the frequency has to be changed. Accordingly, after transmission data and error correction data, to be sent to the communication device 1b, are created in S508, the counter 262a is updated in S509, and an NG signal is created as hop data in S516.

If the time determining unit 27 determines that the reference holding time has not yet elapsed ("no" in S507), on the other hand, it is unnecessary to change the current frequency. In this case, after transmission data and error correction data, to be sent to the communication device 1b, are created in S510, an error rate of the presently-received reception data is calculated in S511 based on the reception data and the error correction data received in S504. Also in S511, the calculated error rate is compared with the predetermined first reference error rate. If the calculated error rate is equal to or lower than the first reference ("yes" in S512), it is determined that it is unnecessary to change the current frequency. Accordingly, the program proceeds to S513 where an OK signal is created as hop data. If the calculated error rate is greater than the first reference error rate ("no" in S512), on the other hand, the counter 262a is updated in S509. Then, an NG signal is created as hop data in S516.

Then, in S514, communication is performed between the communication devices 1a and 1b at the frequency corresponding to the address presently set in the counters 261a and 261b. At this time, the communication device 1a sends the created transmission data to the communication device 1b in S515. Then, the process returns to S502 where the counter 261a is set to the present address number set in the counter 262a.

Next, the operation of the communication device 1b will be described with reference to FIGS. 18(b) and 18(c). The description will be brief because the operation of the communication device 1b is similar to that of the device 1a.

After the initialization operation at S601, the communication device 1b performs in S614 communication with the device 1a at the frequency corresponding to the address number presently set in the counter 261b. At the same time, the device 1a performs the communication operation of S503. Accordingly, the device 1b transmits transmission data to the device 1a in S615. The device 1a receives the data in S504.

Then, in S602, the counter 261b is set to the address number presently stored in the counter 262b. In S603, then, the device 1b performs communication again. At the same time, the device 1a performs the communication in S514 as shown in FIG. 18(c). The communication is performed at the frequency presently indicated by the counter 261a in the communication device 1a and the counter 261b in the communication device 1b. The communication device 1b therefore receives data in S604 which is transmitted from the communication device 1a in S515. In the communication device 1b, hop data is separated from the received data in S605. If the hop data is determined in S605 to contain an NG signal, the counter 262b is updated in S606; transmission data and error correction data, to be sent to the communication device 1a, are created in 6617, and an OK signal is created as hop data; and the counter 261b is set to the address number presently set in the counter 262b in S618.

If the hop data is determined in S605 to contain an OK signal, on the other hand, the time determining unit 27b determines whether the reference holding time has elapsed in S607. If the reference holding time has elapsed ("yes" in S607), transmission data and error correction data, to be sent to the communication device 1a, are created in S608, and the counter 262b is updated in S609. An NG signal is then created as hop data in S616.

If the time determining unit 27 determines that the reference holding time has not yet elapsed ("no" in S607), transmission data and error correction data, to be sent to the communication device 1a, are created in S610. Then, in —S611, an error rate for the current frequency is calculated based on the transmission data and error correction data received in S604. The calculated error rate is compared with the first reference error rate in S611. If the error rate is equal to or lower than the first reference ("yes" in S612), an OK signal is created as hop data in S613. If the error rate is greater than the reference ("no" in S612), on the other hand, the counter 262b is updated in S609, and an NG signal is created as hop data in S616.

Then, the program returns to S614 where communication is performed between the communication devices 1a and 1b at the frequency indicated by the addresses presently set in the counters 261a and 261b. At this time, the communication device 1b sends the created transmission data and hop data to the communication device 1a in S615. The communication device 1a receives the data in S504.

As described above, according to the present modification, the timer 27a monitors the time that elapses after the frequency has hopped to the current frequency. The device 1 determines whether or not the predetermined time has passed after the frequency has hopped to the current frequency. The frequency is changed when it is determined that the error rate has exceeded the first reference value or when it is determined that the predetermined time has elapsed after the latest hopping operation, whichever determination occurs first. Thus, the amount of time communicating at each frequency can be restricted even when error rate is not lowered. Privacy of communication can be protected.

It is now assumed that the communication device 1a detects that reception data at frequency f1 has a high error rate in S512. In this case, the counter 262a is updated in S509. Then, NG hop data is created in S516 and is transmitted to the communication device 1b together with transmission data in S515 (S604). This communication operation is performed still at the frequency f1. Then, in the device 1a, the counter 261a is also updated in S502. In the device 1b, the NG hop data is received in S604, and the counter 262b is updated in S606. Then, in S618, the counter 261b is set to the address newly updated in the counter 262b. Accordingly, at the next communication process of S614 (SS03), the device 1b transmits transmission data to the device 1a at the next frequency f2.

Similarly, it is now assumed that the communication device 1b detects that reception data at frequency f2 has a high error rate in 6612. In this case, the counter 262b is updated in S609. Then, NG hop data is created in S616 and is transmitted to the communication device 1a together with transmission data in S615 (S504). This communication operation is performed still at the frequency f2. Then, in the device 1b, the counter 261b is updated in S602. In the device 1a. the NG hop data is received in S504, and the counter 262a is updated in S506. Then, in S518, the counter 261a is set to the address newly updated in the counter 262a. Accordingly, at the next communication process of S514 (S603), the device 1a transmits transmission data to the device 1b at the next frequency f3.

Figure 17:
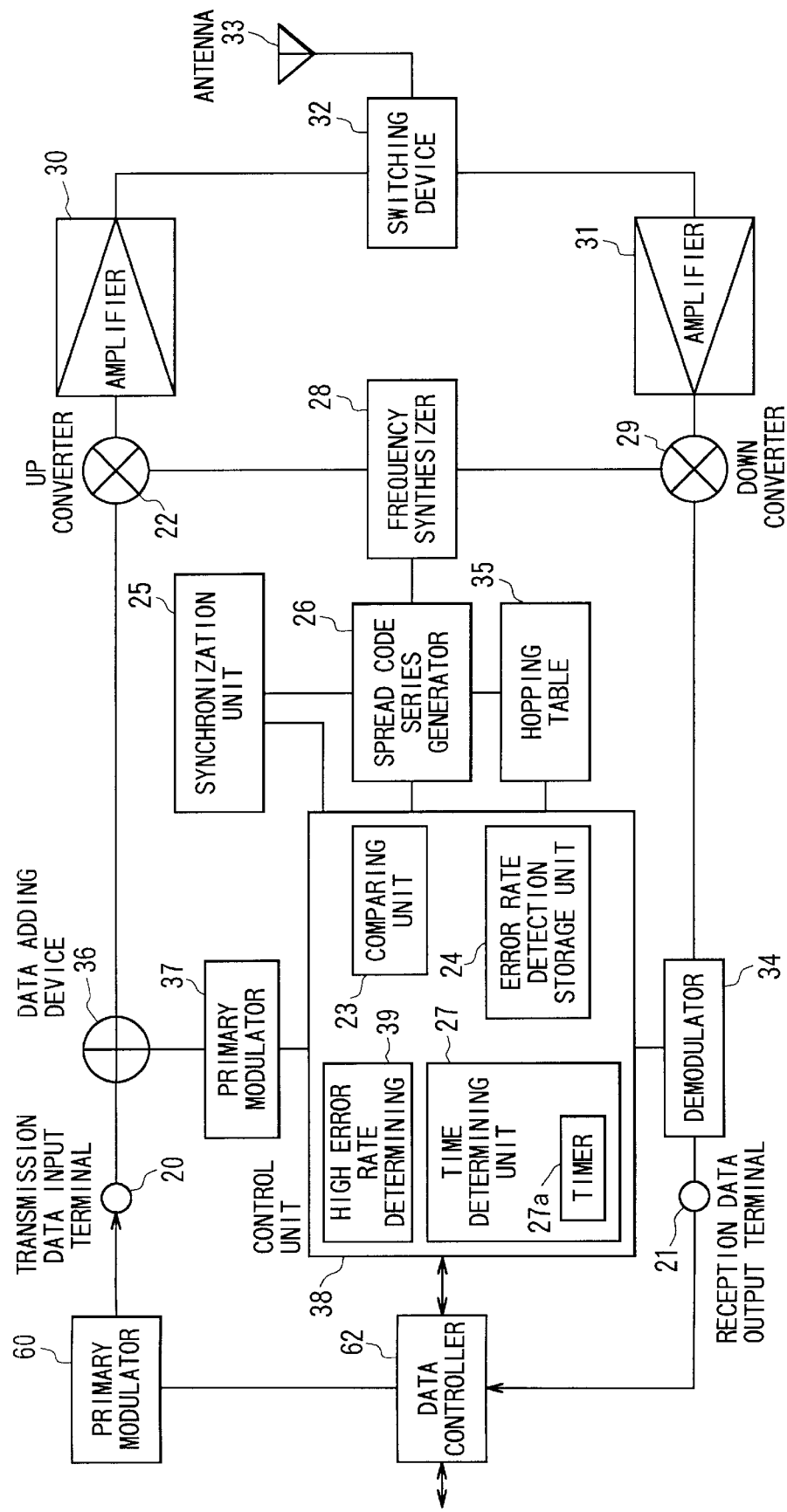
FIG. 17 is a block diagram showing the construction of a communication device of a second modification of the third embodiment.

FIG. 17 shows a wireless communication device of a second modification of the third embodiment.

The communication device 1 of the present modification is the same as that of the above-described first modification of FIG. 16 except that the control unit 38 is further provided with a high error rate determining unit 39.

In the same manner as in the above-described modification, the control unit 38 generates an NG signal (frequency hop instruction signal) when a time up signal is generated by the time determining unit 27 or when the comparing unit 23 determines that the error rate of the reception data becomes higher than the first reference error rate, whichever occurs first.

The high error rate determining unit 39 is for determining whether or not the error rate detected by the error rate detection storage unit 24 is higher than a second reference error rate, which is higher than the first reference error rate. If the error rate is higher than the second reference error rate, the high error rate determining unit 39 generates a table changing signal. In response to the table changing signal, the control unit 38 changes the hopping table 35 through removing, from the table 35, data of the current frequency which has been detected as provides the high error rate. That is, the control unit 38 removes the frequency data from the table area to a spare area. The control unit 38 may additionally move data of a spare frequency to the address previously occupied by the frequency data just removed. Thus, data of the current frequency may be excluded from the hopping table 35, or may be replaced with another frequency data. Thus, the content of the hopping table 35 can be changed.

Alternatively, the data of the current frequency may be replaced with data of another frequency whose error rate has already been detected as equal to or lower than the second reference error rate.

Or, when retrieving data of a certain frequency from the hopping table 35 for the next communication according to a hop instruction signal, the high error rate determining unit 39 may judge whether or not the retrieved frequency has been used previously and has been determined to have a high error rate, higher than the second reference error rate. When the retrieved frequency has been determined to have a high error rate, the control unit 38 may control the spread code series generator 26 not to use the retrieved frequency, but to use a frequency next to the retrieved frequency.

Further, it is possible to return the hopping table 35 to its initial state when the number of changes applied to the hopping table 35 exceeds a reference number or when the number of frequencies set to be usable in the hopping table 35 fall below a reference number.

According to the present modification, the frequency used when a high error rate is detected will no longer be used in subsequent cycles from the hopping table 35. Thus, by removing frequencies resulting in a high error rate, the data transfer rate can be increased. The hopping table, and therefore the hopping pattern, is returned to its initial state if the total number of available frequencies is determined to fall below the reference number. Further, by repeating this process, a private duplex communication can be attained, and improvements can be made on communication privacy with the spread spectrum communication using the frequency hopping method. Also, it becomes unnecessary for the spread code generator to generate PN codes (spread codes) but merely select codes or frequencies from the memory (table).

Figure 19:
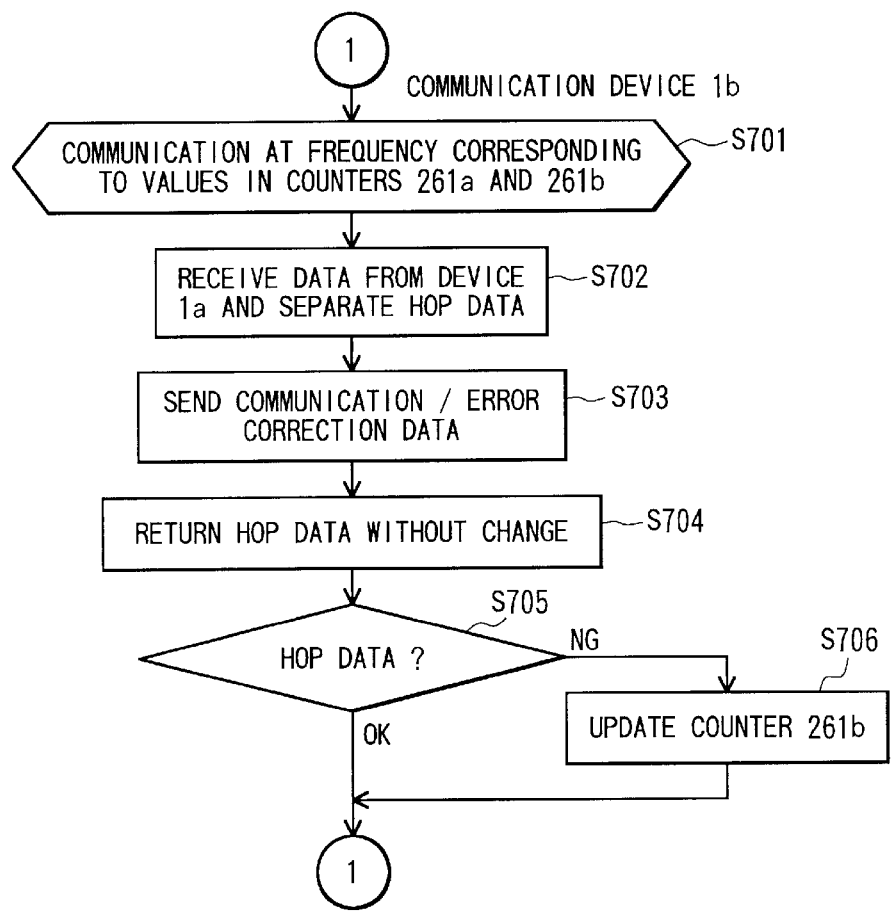
FIG. 19 is a flowchart showing the operations performed in the communication device of FIG. 1 in response to transmission from the communication device as shown in FIG. 18(a)

A third modification of the third embodiment will be described below with reference to FIG. 19.

Figure 1:
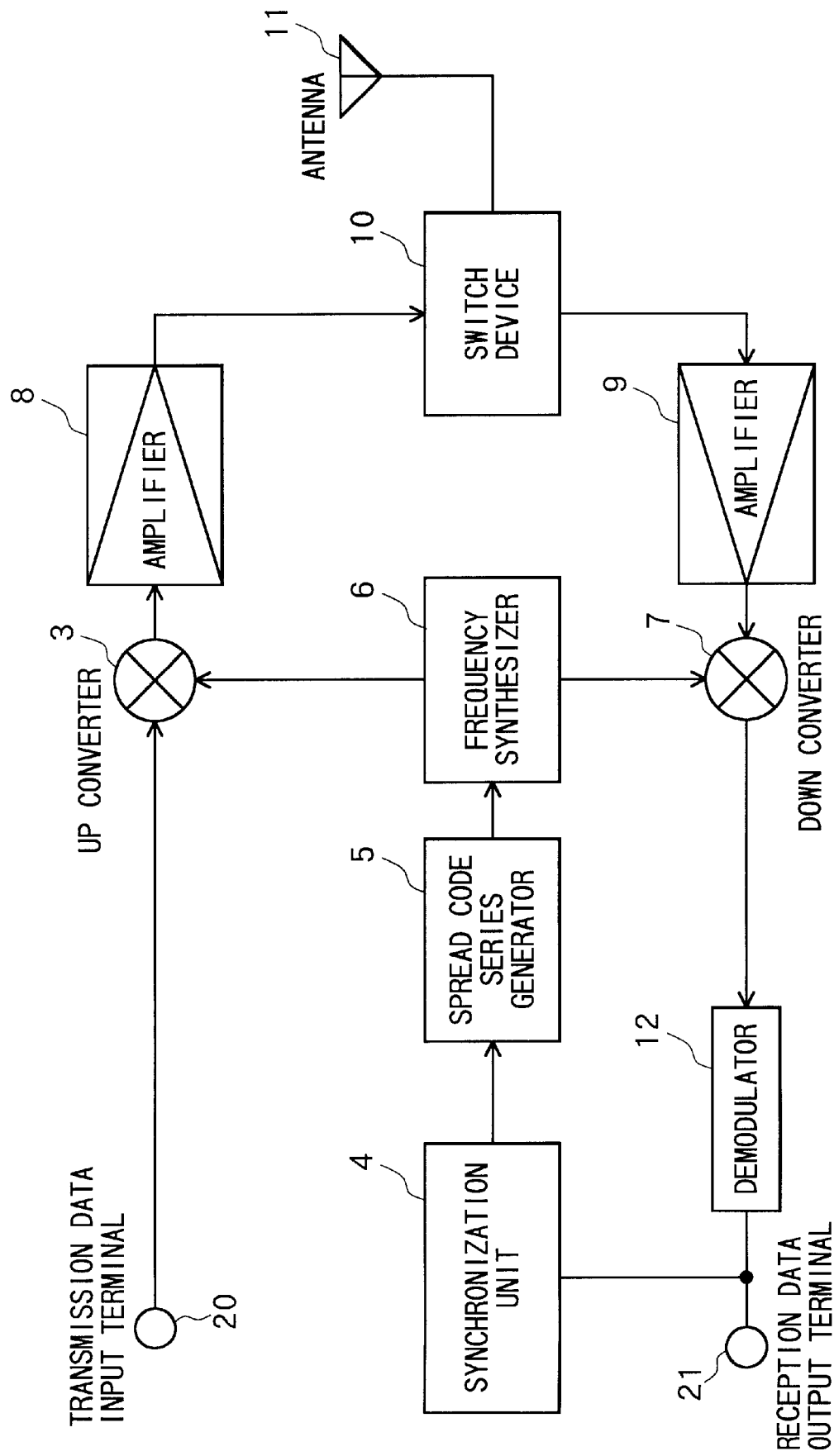
FIG. 1 is a block diagram of a communication device used in a conceivable wireless communication systems.
Figure 2:
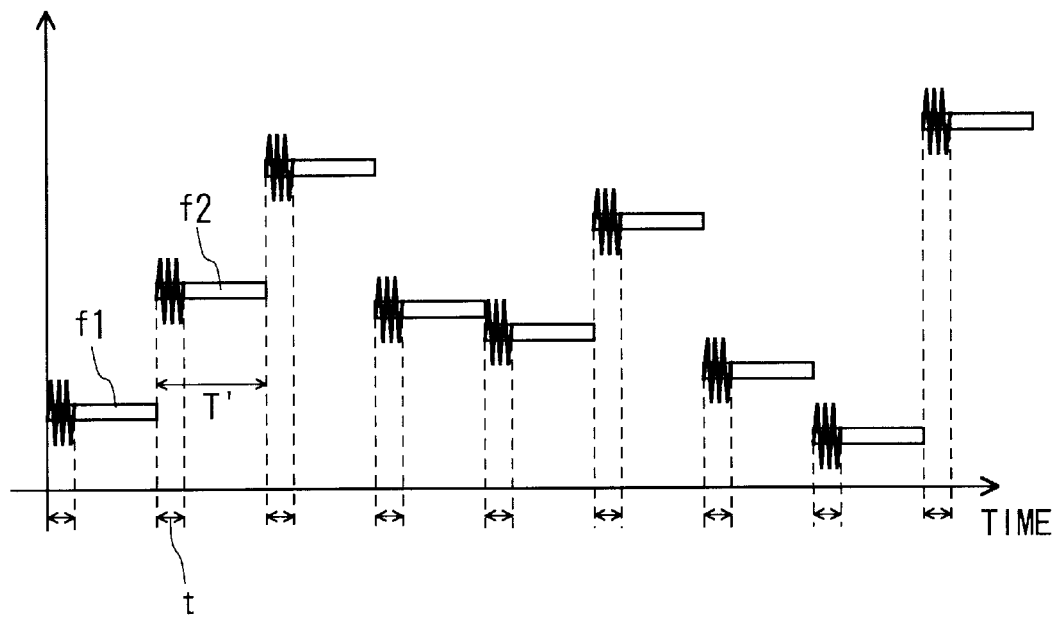
FIG. 2 is a graph showing the relationship between carrier wave frequencies and time in the conceivable wireless communication systems.

According to the present modification, only one of the pair of communication devices 1a and 1b is constructed from the communication device shown in FIG. 16. The other communication device is the same as the conceivable device shown in FIG. 1. In this example, the communication device 1a is structured as shown in FIG. 16, and the communication device 1b is structured as shown in FIG. 1. Accordingly, the device 1b is not provided with the error rate detection storage unit 24 or the comparing unit 23.

Since the time required to calculate error rates ultimately places restrictions on the transfer rate, when the communication device 1b does not perform this calculation operation, it is possible to increase the transfer rate.

In this modification, the communication device 1a performs the operations exactly the same as those shown in FIG. 18(a). The communication device 1b does not perform the operation oration in FIG. 18(b), but performs the operation in FIG. 19. That is, first, in S701, communication is performed at the frequency indicated by the counters 261a in the communication device 1a and the counter 261b in the communication device 1b. At the same time, the communication device 1a performs the process of S514. Then, while the communication device 1a performs the process of S515, the communication device 1b receives data transmitted from the communication device 1a, and separates the hop data from the reception data in S702. Next, in S703, the transmission data and error correction data are created by the communication device 1b, and sent to the communication device 1a. Then, in S704, the hop data received from the device 1a is returned to the device 1a without effecting any changes to the hop data. At the same time, the device 1a performs processes of S502–S504. If the received hop data contains an OK signal in S705, no further operations are executed. On the other hand, if the hop data contains an NG signal ("NG" in S705), the counter 261b is updated in S706 to hop to the next frequency, which will be used during the next reception time slot.

In the above description for the third embodiment and its modifications, the transmission data format shown in FIG. 20 is used. It is obvious, however, that changing the order of the transmission data, error correction data, and hop data would have no adverse effects.

Further, although the control unit 38 is shown mounted in the communication device in FIGS. 3, 14, 16, and 17, the control operation of the control unit 38 can be executed by a hardware circuit, software program, and the like.

As described above, the wireless communication system of the present invention is for performing bidirectional communication using a frequency hopping method, during which communication the frequency to switched. According to the first embodiment, the communication system is designed to adjust the length of time for each frequency. The communication system controls communications according to the adjusted holding time. Accordingly, the length of the holding time is change, and communication is performed with holding each frequency for the altered holding time. Because the length of time for communicating at any one frequency has to be limited in order to maintain privacy and allow the use of multiple channels, the length of the holding time is ordinarily set lower than the maximum limit. The closer the holding time gets to this limit, the fewer times frequency hopping is performed over time and the smaller the total length of occupied time. Hence, the transmission rate increases as the holding time nears the limit. On the other hand, if the length of the holding time is shortened, the number of frequency hopping increases, improving the privacy or secrecy of transmitted data. Thus, the transmission rate can be increased by increasing the holding time in order to decrease the occupied time that occurs when frequency hopping. Conversely, privacy of data can be improved by decreasing the holding time in order to increase the number of frequency hops.

The user can set his/her desired value for the length of the holding time to suit the type of data to be sent. For example, if the data being sent need not be kept private, the holding time can be set long to increase transfer speed. However, if the data is highly private, the holding time can be set short to improve privacy. Thus, It is possible to change the holding time to suit the demands of the user, allowing either the transfer rate or privacy to be improved.

It is desirable that the communication device automatically shortens the holding time when the communication data is voice data and lengthens the holding time when the data is non-voice data. The holding time is thus automatically shortened during the communication of voice data and lengthened during the communication of non-voice data. This method is used because non-voice data contains a comparatively large volume of data, usually making an increase in the transfer rate more important than privacy. On the other hand, voice data has a comparatively low volume of data, usually making secrecy more important than an increase in the transfer rate.

The communication device may be designed to determine whether each transmission contains voice data or non-voice data and to change the holding time to suit the result of that determination. Alternatively, the transmitting device may be designed to send a personal ID signal by which the receiving device can determine whether the transmitting device will send non-voice data, such as image data from a facsimile device, or voice data as from a telephone. The receiving device is designed to change the holding time to correspond to the determined type of data. Thus, it is possible to improve either the transmission rate or privacy by changing the holding time to a value appropriate to the type of data being transmitted.

In the first embodiment, the communication data contains holding time data. The holding time is changed in correspondence with the holding time data. That is, the transmitting communication device adds holding time data to the communication data in every transmission. The length of the holding time is determined based on the transmitted holding time data, setting a longer holding time for non-voice data, such as image data, and setting a shorter holding time for voice data. Since the holding time is adjusted based on the holding time data included in the communication data, a suitable holding time can be set either to increase the transmission rate or to increase privacy, depending on the type of data being transmitted.

Especially when communicating by a packet exchanging method, the holding time is changed so that the possible communication time during the actual holding time becomes equal to an integral multiple of the packet length. According to the packet exchange method, communication data is temporarily stored in the memory buffer, divided into equal blocks or "packets," and transmitted to the other party. Here, if the possible communication time during the actual holding time is not an integral multiple of the packet length, then there will exist a remainder time, which is the difference between the possible communication time and the integral multiple of the packet length nearest but not greater than the possible communication time. No data can be transmitted during this remainder time. Thus, the transmission rate cannot be sufficiently increased. However, if the possible communication time is an integral multiple of the packet length, then remainder time will not exist and communication will be efficient, effectively increasing the transfer rate. Therefore, this wireless communication system is effective for increasing the transfer rate when performing packet exchange communication.

Especially when the communication device is stored with the patterns of changes to the holding time, the holding time is changed according to the stored pattern of holding time changes. In this wireless communication system, the holding time for a certain frequency is determined by the pattern of holding time changes. The holding time can be determined each time the frequency changes. Or, the decision whether to stay with the current frequency or change to another frequency can be made at set intervals. For example, the decision is repeatedly attained at the fixed time interval of the basic holding time TH in the second embodiment, with using the hop data pattern and the hop data flag. However, other various methods can be employed. The above-described methods makes it extremely difficult for a third party to intercept communication data, because not only does the frequency change, but the holding time also changes. Hence, privacy can be enhanced.

According to the third embodiment, the error rate of the received signals is detected. The communication device previously stores therein the error rate reference value. The device determines whether or not the detected error rate of the received signals is higher than the first reference value. The frequency of the frequency-hopping signal is hopped to a next frequency when the error rate is determined higher than the first reference value. It is therefore possible to decrease the number the frequency hops. Accordingly, the total length of occupied time t can be decreased. increasing the data transfer rate as a result.

According to the first modification of the third embodiment, time is monitored after a frequency is hopped to a new frequency. It is therefore possible to restrict the length of time for communication at each frequency band, since the maximum time limit is predetermined for communication at any frequency. It becomes possible to satisfy communication conditions within this time limit. Because the device is provided with the hopping pattern table, it is possible to reduce the total length of time required to calculate hopping frequencies, thereby increasing the transfer rate.

According to the second modification of the third embodiment, it is possible to remove data of frequencies proved to provide a high error rate. It is possible to prevent the device from using those frequencies. As a result, the number of frequencies to be used is limited, and accordingly the total amount of occupied time can be decreased, resulting in a corresponding increase in the transfer rate.

While the invention has been described in detail with reference to the specific embodiments thereof, it would be apparent to those skilled in the art that various changes and modifications may be made therein without departing from the spirit of the invention.

For example, in the above-described embodiments and modifications, the communication device 1 stores therein the hopping pattern table 35. However, the communication device may not store the hopping pattern. When the frequency has to be changed to the next frequency, the communication device may calculate a next hopping frequency with using a predetermined calculating formula, a predetermined number train, a predetermined spread code series, or the like.

In this case, according to the third embodiment, when calculating a certain frequency for the next communication according to a hop instruction signal, the high error rate determining unit 39 may judge whether or not the calculated frequency has been used previously and has been determined to have a high error rate, higher than the second reference error rate. When the calculated frequency has been determined to have a high error rate, the control unit 3B may control the spread code series generator 26 not to use the calculated frequency, but to calculate another frequency.

What is claimed is:

1. A wireless communication device for performing bi-directional communication with a remote communication device using a frequency hopping method, the device comprising:
   a frequency changing unit changing a frequency, at which communication is performed;
   a communication unit performing communication at the changed frequency for a holding time;
   a holding time length controlling unit controlling a length of the holding time and controlling the communication unit to perform communications at the changing frequency for the controlled holding time; and
   a holding time inputting unit allowing a user to input the user's desired value as the length of the holding time, the holding time length controlling unit changing the length of the holding time into the user's inputted value.

2. A wireless communication device of claim 1, further comprising a storing unit storing a frequency changing pattern, according to which the frequency changing unit changes the frequency.

3. A wireless communication device as claimed in claim 2, wherein the holding time length controlling unit includes a unit adding holding time data, indicative of the inputted holding time, to the communication data in every transmission of communication data.

4. A wireless communication device of claim 3, wherein the holding time length controlling unit further includes:
- a holding time data detecting unit detecting the holding time data contained in the communication data transmitted from the remote communication device; and
- a unit changing the length of the holding time in correspondence with the holding time data.

5. A wireless communication device of claim 1, wherein the holding time length controlling unit includes:
- an error rate detecting unit detecting an error rate of signals received from the remote communication device at a present frequency;
- a memory storing a predetermined error rate reference value;
- an error rate determining unit determining whether or not the detected error rate of the received signals is higher than the predetermined error rate reference value; and
- a frequency changing control unit controlling the frequency changing unit to change the frequency from the present frequency into another frequency when the error rate determining unit determines that the detected error rate is higher than the predetermined error rate reference value, the frequency changing control unit controlling the communication unit to perform communications according to the changed frequency.

6. A wireless communication device of claim 5, wherein the holding time length controlling unit further includes:
- a timing unit measuring time after the frequency is changed; and
- a time determining unit determining whether or not the measured time reaches a predetermined time, and
- wherein the frequency changing control unit controls the frequency changing unit to change the frequency at a timing which is an earlier one of a timing when the error rate determining unit determines that the error rate becomes higher than the error rate reference value and another timing when the time determining unit determines that the predetermined time has elapsed.

7. A wireless communication device of claim 6, further comprising a storing unit storing a frequency changing pattern, according to which the frequency changing unit changes the frequency.

8. A wireless communication device of claim 7, further comprising:
- high a error rate frequency determining unit for determining mining a frequency whose error rate is determined by the error rate determining unit to be higher than another predetermined error rate reference value which is higher than the predetermined error rate reference value; and
- pattern changing means for changing the frequency changing pattern stored in the pattern storing means through removing the determined frequency from the frequency changing pattern.

9. A wireless communication device of claim 8, wherein the pattern changing unit replaces the determined frequency with another frequency whose error rate has been determined by the high error rate frequency determining unit to be lower than the other predetermined error rate reference value.

10. A wireless communication device for performing bi-directional communication with a remote communication device using a frequency hopping method, the device comprising:
- a frequency changing unit changing a frequency, at which communication is performed;
- a communication unit performing communication at the changed frequency for a holding time;
- a holding time length controlling unit controlling a length of the holding time and controlling the communication unit to perform communications at the changed frequency for the controlled holding time; and
- a frequency changing pattern storing unit storing a frequency changing pattern, according to which the frequency changing unit chances the frequency,
- wherein the holding time length controlling unit sets the holding time to a first value when communication data to be communicated by the communication unit is voice data and sets the holding time to a second value longer than the first value when the data to be communicated by the communication unit is non-voice data.

11. A wireless communication device of claim 10, wherein the holding time length controlling unit includes:
- a determining unit determining whether or not data to be communicated contains voice data; and
- a holding time changing unit changing the holding time in correspondence with the determined result.

12. A wireless communication device of claim 11, wherein the determining unit includes:
- a detecting unit detecting a type of the communication device;
- a sending unit sending, to the remote communication device, a personal ID signal indicative of the type of the communication device, thereby allowing the remote communication device, to which the communication is to be performed, to determine whether or not the subject communication device will send voice data.

13. A wireless communication device for performing bi-directional communication with a remote communication device using a frequency hopping method, the device comprising:
- a frequency changing unit changing a frequency, at which communication is performed;
- a communication unit performing communication at the changed frequency for a holding time;
- a holding time length controlling unit controlling a length of the holding time and controlling the communication unit to perform communications at the changed frequency for the controlled holding time; and
- a frequency changing pattern storing unit storing a frequency changing pattern according to which the frequency changing unit changes the frequency,
- wherein the communication unit communicates packet data according to a packet exchanging method, the holding time length controlling unit adjusting the holding time so that a possible communication time during the holding time becomes equal to an integral multiple of the packet length.

14. A wireless communication device of claim 13, wherein the communication unit includes:
- a unit temporarily storing communication data;
- a unit dividing the communication data into equal packets; and
- a unit transmitting the packets to the remote communication device.

15. A wireless communication device of claim 14, wherein the possible communication time during the holding time is equal to a time length obtained by subtracting an occupied time length from the length of the holding time.

16. A wireless communication device for performing bi-directional communication with a remote communication device using a frequency hopping method, the device comprising:

a frequency changing unit changing a frequency, at which communication is performed;

a communication unit performing communication at the changed frequency for a holding time;

a holding time length controlling unit controlling a length of the holding time and controlling the communication unit to perform communications at the changed frequency for the controlled holding time;

a frequency changing pattern storing unit storing a frequency changing pattern, according to which the frequency changing unit changes the frequency; and a holding time changing pattern storing unit storing a pattern for changing the holding time, the holding time length controlling unit changing the holding time according to the pattern stored in the pattern storing unit.

17. A wireless communication device of claim 16, wherein the holding time length controlling unit determines the holding time for a certain frequency the stored pattern each time according to the frequency changes.

18. A wireless communication device of claim 16, wherein the holding time length controlling unit determines whether to stay with a current frequency or to change to another frequency at set time intervals.

\* \* \* \* \*

UNITED STATES PATENT AND TRADEMARK OFFICE
CERTIFICATE OF CORRECTION

PATENT NO. : 6,130,905
DATED : October 10, 2000
INVENTOR(S) : Hironobu Wakayama

It is certified that error appears in the above-identified patent and that said Letters Patent is hereby corrected as shown below:

Claim 3, line 3, change "holding time" to --time of transmission between frequency hops--;
line 4, change "holding time" to --time of transmission between frequency hops--.

Claim 4, lines 3 and 4, change "holding time" to --time of transmission between frequency hops--;
line 6, change "holding time" to --time of transmission between frequency hops--.

Claim 10, line 15, change "chances" to --changes--.

UNITED STATES PATENT AND TRADEMARK OFFICE
CERTIFICATE OF CORRECTION

PATENT NO. : 6,130,905
DATED : October 10, 2000
INVENTOR(S) : Hironobu Wakayama

It is certified that error appears in the above-identified patent and that said Letters Patent is hereby corrected as shown below:

Claim 16, line 8, change "holding time" to --time of transmission between frequency hops--;
line 10, change "holding time" to --time of transmission between frequency hops--;
line 12, change "holding time" to --time of transmission between frequency hops--;
line 17, change "holding time" to --time of transmission between frequency hops--;
line 18, change "holding time" to --time of transmission between frequency hops--.
Claim 17, line 3, change "holding time" to --time of transmission between frequency hops--.

Signed and Sealed this

Twenty-second Day of May, 2001

*Attest:*

NICHOLAS P. GODICI

*Attesting Officer*  *Acting Director of the United States Patent and Trademark Office*

UNITED STATES PATENT AND TRADEMARK OFFICE
CERTIFICATE OF CORRECTION

PATENT NO.   : 6,130,905
DATED         : October 10, 2000
INVENTOR(S) : Hironobu Wakayama It is certified that error appears in the above-identified patent and that said Letters Patent is hereby corrected as shown below:

Claim 1,
Lines 8,10,12,14,and 16, change "holding time" to -- time of transmission between frequency hops --;

Signed and Sealed this

Twenty-fifth Day of December, 2001

JAMES E. ROGAN
Director of the United States Patent and Trademark Office

Attest:

Attesting Officer